US012767615B2

(12) United States Patent
Schmid et al.

(10) Patent No.: US 12,767,615 B2
(45) Date of Patent: Oct. 20, 2026

(54) METHOD FOR OBTAINING A UREA-BASED FERTILIZER COMPOSITION COMPRISING A (THIO)PHOSPHORIC ACID TRIAMIDE UREASE INHIBITOR VIA PROVIDING A LIQUID OR SOLID PREMIX WITH SPECIFIC WEIGHT RATIOS

(71) Applicant: BASF SE, Ludwigshafen (DE)

(72) Inventors: Markus Schmid, Limburgerhof (DE); Wolfram Zerulla, Limburgerhof (DE); Nadine Tresch, Limburgerhof (DE); Maarten Staal, Limburgerhof (DE); Uwe Thiel, Limburgerhof (DE); Gregor Pasda, Limburgerhof (DE); Karl-Heinrich Schneider, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 1513 days.

(21) Appl. No.: 17/046,012

(22) PCT Filed: Apr. 1, 2019

(86) PCT No.: PCT/EP2019/058127

§ 371 (c)(1),
(2) Date: Oct. 8, 2020

(87) PCT Pub. No.: WO2019/197183

PCT Pub. Date: Oct. 17, 2019

(65) Prior Publication Data

US 2021/0155560 A1 May 27, 2021

(30) Foreign Application Priority Data

Apr. 10, 2018 (EP) .................................... 18166465
Sep. 10, 2018 (EP) .................................... 18193458

(51) Int. Cl.
*C05G 3/90* (2020.01)
*C05C 9/00* (2006.01)
*C07F 9/22* (2006.01)

(52) U.S. Cl.
CPC ................ *C05G 3/90* (2020.02); *C05C 9/005* (2013.01); *C07F 9/224* (2013.01)

(58) Field of Classification Search
CPC ............ C05G 3/90; C05C 9/005; C07F 9/224
See application file for complete search history.

(56) References Cited

U.S. PATENT DOCUMENTS 4,530,714 A 7/1985 Kolc et al.
5,352,265 A 10/1994 Weston et al.

(Continued)

FOREIGN PATENT DOCUMENTS

EP 0 119 487 A1 9/1984
EP 3109223 A1 12/2016

(Continued)

OTHER PUBLICATIONS

International Application No. PCT/EP2019/058127, International Search Report and Written Opinion, mailed Jun. 26, 2019.

(Continued)

*Primary Examiner* — Wayne A Langel
(74) *Attorney, Agent, or Firm* — MARSHALL, GERSTEIN & BORUN LLP

(57) ABSTRACT

Method for obtaining a fertilizer composition comprising (iii) at least one urea-containing fertilizer (1); and (iv) at least one (thio)phosphoric acid triamide (2) according to general formula (I) wherein $X^1$ is O or S; $R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alylaminocarbonyl; $R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or $R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and $R^3$, $R^4$, $R^5$, and $R^6$ are independently of each other selected from the group consisting of H and $C_1$-$C_4$-alkyl; comprising the steps: a) providing a solid and/or liquid premix (P) wherein the premix (P) comprises at least one urea-containing fertilizer (1) and at least one (thio)phosphoric acid triamide (2) in a weight ratio of 1:6 to 400:1 based on the total weight of all urea-containing fertilizers (1) and of all (thio)phosphoric acid triamides (2), wherein at least 85 wt % of the premix (P) (a1) is not a melt; and (a2) is not obtained via melting of any of the at least one urea-containing fertilizer (1) or melting of any of the at least one (thio)phosphoric acid triamide (2); and (a3) is not obtained via dissolving or mixing the at least one (thio)phosphoric acid tri-amide (2) in/with a solvent (S) having a boiling point of less than 100° C., and b) adding the premix (P) to a melt (Q) comprising urea-containing fertilizer (1) by forming a mixture (M) n comprising the at least one urea-containing fertilizer (1) and the at least one (thio) phosphoric acid triamide (2), wherein the residence time of the thus formed mixture (M) before granulation is adjusted such that the at least one (thio)phosphoric acid tri-amide (2) is not or almost not decomposed in the mixture (M); and c) forming solid fertilizer granules by use of the mixture (M) comprising the at least one urea-containing fertilizer (1) and the at least one (thio)phosphoric acid triamide (2).

(I)

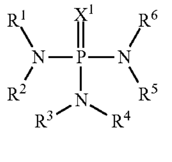

16 Claims, No Drawings

(56) References Cited

U.S. PATENT DOCUMENTS

| | | | |
|---|---|---|---|
| 2010/0218575 | A1 | 9/2010 | Wissemeier et al. |
| 2011/0154874 | A1 | 6/2011 | Rahn et al. |
| 2017/0022120 | A1 | 1/2017 | Barr et al. |
| 2019/0055169 | A1 | 2/2019 | Peters et al. |

FOREIGN PATENT DOCUMENTS

| | | | | |
|---|---|---|---|---|
| WO | WO-2007/022568 | A1 | 3/2007 | |
| WO | WO 2015/001457 | A3 * | 1/2015 | ............... C05G 3/08 |
| WO | WO-2015/062667 | A1 | 5/2015 | |
| WO | WO-2017/125383 | A1 | 7/2017 | |

OTHER PUBLICATIONS

European Search Report for EP Patent Application No. 18193458.9, Issued on Feb. 22, 2019, 3 pages.

Kiss, et al., “Improving Efficiency of Urea Fertilizers by Inhibition of Soil Urease Activity”, Mar. 31, 2002, pp. 1-342.

* cited by examiner

METHOD FOR OBTAINING A UREA-BASED FERTILIZER COMPOSITION COMPRISING A (THIO)PHOSPHORIC ACID TRIAMIDE UREASE INHIBITOR VIA PROVIDING A LIQUID OR SOLID PREMIX WITH SPECIFIC WEIGHT RATIOS

The present invention relates to a method for obtaining at least one urea-based fertilizer composition via providing a liquid or solid premix comprising the urea-containing fertilizer and a (thio)phosphoric acid triamide urease inhibitor in specific weight ratios and via adding this premix to a melt of the urea-containing fertilizer.

Worldwide, the predominant and further-increasing amount of the nitrogen used for fertilizing is employed in the form of urea or urea-containing fertilizers. Urea itself, however, is a form of nitrogen which is absorbed very little if at all, being hydrolyzed relatively rapidly by the enzyme urease, which is present ubiquitously in the soil, to form ammonia and carbon dioxide. In this process, in certain circumstances, gaseous ammonia is emitted to the atmosphere, and is then no longer available in the soil for the plants, thereby lowering the efficiency of fertilization.

It is known that the degree of utilization of the nitrogen when using urea-containing fertilizers can be improved by spreading urea-containing fertilizers together with substances which are able to inhibit or decrease the enzymatic cleavage of urea (for a general review, see Kiss, S. Simihaian, M. (2002) Improving Efficiency of Urea Fertilizers by Inhibition of Soil Urease Activity, ISBN 1-4020-0493-1, Kluwer Academic Publishers, Dordrecht, The Netherlands).

Among the most potent known urease inhibitors are N-alkylthiophosphoric acid triamides and N-alkylphosphoric acid triamides, which are described in EP 0 119 487, for example.

Additionally, mixtures of N-alkylthiophosphoric acid triamides such as N-(n-butyl)thiophosphoric acid triamide (NBPT) and N-(n-propyl)thiophosphoric acid triamide (NPPT) can be used. The mixtures and their preparation are described in US 2010/218575 A1, for example.

These urease inhibitors are described in U.S. Pat. No. 4,530,714, for example. In order for this class of compound to be able to act as a urease inhibitor, there must first be a conversion to the corresponding oxo form. That form reacts subsequently with the urease, causing its inhibition.

It is advisable to apply the urease inhibitors together with the urea onto or into the soil, since this ensures that the inhibitor comes into contact, together with the fertilizer, with the soil. The urease inhibitor may be incorporated in the urea by, for example, dissolving it into the melt prior to urea granulation or prilling. A process of this kind is described in U.S. Pat. No. 5,352,265, for example. A further option is to apply the urease inhibitor to the urea granules or prills, in the form of a solution, for example. Corresponding processes for application, and suitable solvents, are described in US 2010/218575 A1, for example.

On the one hand, it is known in the prior art that the storage life of the urease inhibitor is limited in the presence of urea-containing fertilizers. The higher the temperature, the shorter is the storage life. If, for example, urea is stored under tropical conditions, a major part of the urease inhibitor has undergone decomposition, generally, after about four weeks of storage.

The degradation of the (thio)phosphoric acid triamide inhibitor is a known phenomenon which occurs during storage of the fertilizer. Slowing down the degradation rate allows saving active material without losing efficiency and thus brings an economic advantage. The potential use of certain urease inhibitors is defined in Europe by the European Fertilizer Regulation CE 2003/2003 in its last version dated 15 Dec. 2014. This regulation defines for approved urease inhibitors as for the NBPT authorized minimum and maximum concentrations in the urea containing fertilizer. The rate of degradation defines thus the lifetime of the fertilizer until the presence of the urease inhibitor cannot be claimed any more. Since degradation occurs and regulatory limits exist, a precise dosing of the urease inhibitor into the fertilizer is of importance. Also, a precise dosing allows to adjust the amount of the inhibitor to the desired concentration in order to achieve either long lifetime (concentration close to the upper regulatory limit) or a more economic product (concentration close to the lower regulatory limit), depending on the desired storage time.

In order to address this degradation and stability problem, WO 2015/062667 discloses a composition comprising a (thio)phosphoric acid triamide urease inhibitor in combination with a functionalized amine to increase the stability and storage life of the (thio)phosphoric acid triamides urease inhibitors in the presence of urea-containing fertilizers.

US 2011/0154874 A1 discloses amine-based additives selected from methyldiethanolamine, tetrahydroxypropylethylenediamine, trimethylaminoethylethanolamine, N,N,N',N'-tetramethyl-1,6-hexanediamine, N,N',N"-tris(dimethylaminopropyl)hexahydrotriazine, and 2,2'-dimorpholinyldiethyl ether.

On the other hand, it is also known in the prior art that the use of (thio)phosphoric acid triamide urease inhibitors such as N-n-butylthiophosphoric acid triamide (NBPT) has some difficulties and challenges regarding handling and precise dosing, since NBPT is a sticky, waxy compound, sensitive to water and heat, and has solid flow parameter which are disadvantageous for a precise direct dosing of NBPT into urea fertilizers.

In order to address this problem, WO 2017/125383 discloses a method for obtaining a urea-based fertilizer composition comprising at least one (thio)phosphoric acid triamide urease inhibitor comprising the steps: a) providing at least one first melt comprising the at least one urease inhibitor at a temperature T1, at which decomposition of the at least one urease inhibitor is completely or almost inhibited; b) providing at least one second melt of temperature T2 comprising urea and/or the at least one urea derivative; c) adding the at least one first melt of the at least one urease inhibitor to the at least one second melt of urea and/or at least one urea derivative by forming a mixture wherein the residence time of the thus formed mixture before granulation is adjusted such that the at least one urease inhibitor is not or almost not decomposed in the mixture; and d) forming solid fertilizer granules by use of the mixture of the at least one urease inhibitor and the urea and/or the at least one urea derivative. However, according to the method disclosed in WO 2017/125383, the (thio)phosphoric acid triamide urease inhibitor will be exposed to high temperatures in the first melt described in step a), which will affect the stability of the (thio)phosphoric acid triamide urease inhibitor later during the process steps of this method as well as its stability later in the granules finally produced.

Therefore, it was an object of the present invention to provide a method for obtaining a urea-based fertilizer composition comprising at least one (thio)phosphoric acid triamide urease inhibitor, by which the stability of the (thio) phosphoric acid triamide urease inhibitor during the process steps of this method as well as its stability in the granules finally produced can be improved compared to prior art methods. Furthermore, it was an object of the present invention to provide a method for obtaining a urea-based fertilizer composition comprising at least one (thio)phosphoric acid triamide urease inhibitor, which has at least one of the following features:

(i) more precise (direct) dosing of the (thio)phosphoric acid triamide urease inhibitor into a melt of urea-based fertilizers, (ii) better miscibility of the (thio)phosphoric acid triamide urease inhibitor in the melt of urea-based fertilizers, (iii) avoiding the use of low-boiling (e.g. boiling degree under 100° C.) solvents for dissolving the (thio)phosphoric acid triamide urease inhibitor, (iv) improved handling of the (thio)phosphoric acid triamide urease inhibitor, (v) providing a ready-to-use premix which can be stored and shipped and directly added to the melt of the urease inhibitor.

In view of the above objects, the present invention relates a method for obtaining a fertilizer composition comprising (i) at least one urea-containing fertilizer (1); and (ii) at least one (thio)phosphoric acid triamide (2) according to general formula (I)

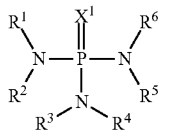

(I)

wherein $X^1$ is O or S;

$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

$R^2$ is H, $C_1$-$C_{20}$-alkyl, $C_3$-$C_{20}$-cycloalkyl, $C_6$-$C_{20}$-aryl, $C_6$-$C_{20}$-aryl-C1-$C_4$-alkyl, or $C_1$-$C_6$-(di)alkylaminocarbonyl; or $R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and $R^3$, $R^4$, $R^5$, and $R^6$ are independently of each other selected from the group consisting of H and $C_1$-$C_4$-alkyl;

comprising the steps:

a) providing a solid and/or liquid premix (P) wherein the premix (P) comprises at least one urea-containing fertilizer (1) and at least one (thio)phosphoric acid triamide (2) in a weight ratio of 1:6 to 400:1 based on the total weight of all urea-containing fertilizers (1) and of all (thio)phosphoric acid triamides (2), wherein at least 85 wt % of the premix (P)

(a1) is not a melt; and (a2) is not obtained via melting of any of the at least one urea-containing fertilizer (1) or melting of any of the at least one (thio)phosphoric acid triamide (2); and (a3) is not obtained via dissolution of the at least one (thio)phosphoric acid triamide (2) in a solvent with a boiling point of less than 100° C., and b) adding the premix (P) to a melt (Q) comprising urea-containing fertilizer (1) by forming a mixture (M) comprising the at least one urea-containing fertilizer (1) and the at least one (thio)phosphoric acid triamide (2), wherein the residence time of the thus formed mixture (M) before granulation is adjusted such that the at least one (thio)phosphoric acid triamide (2) is not or almost not decomposed in the mixture (M); and c) forming solid fertilizer granules by use of the mixture (M) comprising the at least one urea-containing fertilizer (1) and the at least one (thio)phosphoric acid triamide (2).

In the present patent application, the at least one (thio) phosphoric acid triamide urease inhibitor (2) according to general formula (I) is referred to as "TPT". In the present patent application, the melt (Q) comprising urea-containing fertilizer (1) is referred to as "urea melt (Q)" or "melt (Q)". In the present patent application, the premix (P) comprising at least one urea-containing fertilizer (1) and at least one (thio)phosphoric acid triamide (2) in the specific ratio as defined above as used in the present invention is referred to as "TPT-containing premix (P)" or "premix (P)". In the present patent application, weight percent is referred to as "wt %".

In a preferred embodiment of present invention, the premix (P) is liquid.

In another preferred embodiment of present invention, the premix (P) is solid.

In another preferred embodiment of present invention, the premix (P) is partially solid and partially liquid. The weight ratio between the solid part of the premix (P) to the liquid part of the premix (P) is preferably in the range of 1 wt % to 99 wt %, more preferably in the range of 10 wt % to 90 wt %, most preferably in the range of 20 wt % to 80 wt %, particularly preferably in the range of 25 wt % to 75 wt %, particularly more preferably in the range of 30 wt % to 70 wt %, particularly in the range of 35 wt % to 65 wt %, particularly preferably in the range of 40 wt % to 60 wt %, particularly most preferably between 45 wt % and 55 wt %, based on the total weight of the premix (P).

In a preferred embodiment of present invention, the premix (P)

(a1) is essentially not a melt; and (a2) is essentially not obtained via melting of any of the at least one urea-containing fertilizer (1) or melting of any of the at least one (thio)phosphoric acid triamide (2); and (a3) is essentially not obtained via dissolving or mixing the at least one (thio)phosphoric acid triamide (2) in/with a solvent (S) having a boiling point of less than 100° C.

In another preferred embodiment of the present invention, the premix (P)

(a1) is essentially not a melt; and (a2) is essentially not obtained via melting of any of the at least one urea-containing fertilizer (1) or melting of any of the at least one (thio)phosphoric acid triamide (2); and (a3) is essentially not obtained via dissolving or mixing the at least one (thio)phosphoric acid triamide (2) in/with a solvent (S) having a boiling point of less than 120° C., preferably less than 140° C., more preferably less than 160° C., most preferably less than 180° C., particularly preferably less than 200° C., particularly more preferably less than 220° C., particularly less than 240° C.

In another preferred embodiment of the present invention, at least 85 wt % of the premix (P), preferably at least 88 wt % of the premix (P), more preferably at least 90 wt % of the premix (P), most preferably at least 92 wt % of the premix (P), particularly preferably at least 94 wt % of the premix (P), particularly more preferably at least 95 wt % of the premix (P), particularly most preferably at least 96 wt % of the premix (P), for instance preferably at least 97 wt % of the premix (P), for instance more preferably at least 98 wt % of the premix (P), for instance most preferably at least 99 wt % of the premix (P), for instance most preferably at least 99.5 wt % of the premix (P), for example at least 99.9 wt % of the premix (P)

(a1) is not a melt; and (a2) is not obtained via melting of any of the at least one urea-containing fertilizer (1) or melting of any of the at least one (thio)phosphoric acid triamide (2); and (a3) is not obtained via dissolving or mixing the at least one (thio)phosphoric acid triamide (2) in/with a solvent (S) having a boiling point of less than 100° C.

In another preferred embodiment of the present invention, at least 85 wt % of the premix (P), preferably at least 88 wt % of the premix (P), more preferably at least 90 wt % of the premix (P), most preferably at least 92 wt % of the premix (P), particularly preferably at least 94 wt % of the premix (P), particularly more preferably at least 95 wt % of the premix (P), particularly most preferably at least 96 wt % of the premix (P), for instance preferably at least 97 wt % of the premix (P), for instance more preferably at least 98 wt % of the premix (P), for instance most preferably at least 99 wt % of the premix (P), for instance most preferably at least 99.5 wt % of the premix (P), for example at least 99.9 wt % of the premix (P)

(a1) is not a melt; and (a2) is not obtained via melting of any of the at least one urea-containing fertilizer (1) or melting of any of the at least one (thio)phosphoric acid triamide (2); and (a3) is not obtained via dissolving or mixing the at least one (thio)phosphoric acid triamide (2) in/with a solvent (S) having a boiling point of less than 120° C., preferably less than 140° C., more preferably less than 160° C., most preferably less than 180° C., particularly preferably less than 200° C., particularly more preferably less than 220° C., particularly less than 240° C.

"Melting" means changing the state of matter from solid state to liquid state without adding additives such as solvents.

In another preferred embodiment of the present invention, the weight ratio between the at least one urea-containing fertilizer (1) and the at least one (thio)phosphoric acid triamide (2) in the premix as provided in process step a) according to the method of the present invention—based on the total weight of all urea-containing fertilizers (1) and of all (thio)phosphoric acid triamides (2)—is preferably at least 1:5, more preferably at least 1:4, most preferably at least 1:3, particularly preferably at least 1:2, particularly more preferably at least 1:1, particularly most preferably at least 2:1, particularly at least 3:1, for instance preferably at least 4:1, for instance more preferably at least 5:1, for instance most preferably at least 6:1, for instance particularly at least 8:1, for instance at least 10:1, for example preferably at least 12:1, for example more preferably at least 14:1, for example most preferably at least 16:1, for example particularly at least 18:1, for example particularly preferably at least 20:1, for example at least 22:1.

In another preferred embodiment of the present invention, the weight ratio between the at least one urea-containing fertilizer (1) and the at least one (thio)phosphoric acid triamide (2) in the premix as provided in process step a) according to the method of the present invention—based on the total weight of all urea-containing fertilizers (1) and of all (thio)phosphoric acid triamides (2)—is preferably not more than 300:1, more preferably not more than 200:1, most preferably not more than 150:1, particularly preferably not more than 100:1, particularly more preferably not more than 80:1, particularly most preferably not more than 70:1, particularly not more than 60:1, for instance preferably not more than 50:1, for instance more preferably not more than 45:1, for instance most preferably not more than 40:1, for instance particularly not more than 35:1, for instance not more than 30:1, for example preferably not more than 27:1, for example more preferably not more than 23:1, for example most preferably not more than 19:1, for example particularly not more than 15:1, for example particularly preferably not more than 11:1, for example not more than 7:1.

In another preferred embodiment of the present invention, the weight ratio between the at least one urea-containing fertilizer (1) and the at least one (thio)phosphoric acid triamide (2) in the premix as provided in process step a) according to the method of the present invention—based on the total weight of all urea-containing fertilizers (1) and of all (thio)phosphoric acid triamides (2)—is preferably in the range of 1:5 to 300:1, more preferably in the range of 1:4 to 200:1, most preferably in the range of 1:3 to 150:1, particularly preferably in the range of 1:2 to 100:1, particularly more preferably in the range of 1:1 to 80:1, particularly most preferably in the range of 2:1 to 70:1, particularly in the range of 3:1 to 60:1, for instance preferably in the range of 4:1 to 50:1, for instance more preferably in the range of 5:1 to 45:1, for instance most preferably in the range of 8:1 to 40:1, for instance in the range of 10:1 to 35:1, for example preferably in the range of 14:1 to 30:1, for example more preferably in the range of 18:1 to 27:1, for example in the range of 23:1 to 27:1.

In yet another preferred embodiment of the present invention, the weight ratio between the at least one urea-containing fertilizer (1) and the at least one (thio)phosphoric acid triamide (2) in the premix as provided in process step a) according to the method of the present invention—based on the total weight of all urea-containing fertilizers (1) and of all (thio)phosphoric acid triamides (2)—is preferably in the range of 1:2 to 19:1, more preferably in the range of 1:1 to 15:1, most preferably in the range of 2:1 to 11:1, particularly preferably in the range of 3:1 to 7:1.

In yet another preferred embodiment of the present invention, the at least one urea-containing fertilizer (1) contained in the premix (P) has an average particle size in the range of 0.0001 to 60 mm, preferably in the range of 0.0005 to 20 mm, more preferably in the range of from 0.001 to 6 mm, most preferably in the range of from 0.005 to 4 mm, particularly preferably in the range of 0.01 to 2 mm. In yet another preferred embodiment of the present invention, the at least one urea-containing fertilizer (1) contained in the premix (P) is urea and has an average particle size in the range of 0.0001 to 60 mm, preferably in the range of 0.0005 to 20 mm, more preferably in the range of from 0.001 to 6 mm, most preferably in the range of from 0.005 to 4 mm, particularly preferably in the range of 0.01 to 2 mm. The particle size can be determined by sieve test, laser diffraction, dynamic light scattering, or image analysis techniques.

As used herein, the term "(thio)phosphoric acid triamide" in each case covers thiophosphoric acid triamides and phosphoric acid triamides. Thus, the prefix "(thio)" as used herein in each case indicates that a group P═S or a group P═O is covered. However, if the prefix "thio" is used without brackets, this indicates that a group P═S is present.

It is noted that the terms "(thio)phosphoric acid triamide" and "(thio)phosphoric triamide" may interchangeably be used.

As used herein, "(thio)phosphoric acid triamides" may be represented by the following general formula (I)

(I)

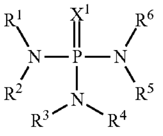

wherein $X^1$ is O or S;

$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or C1-$C_6$-(di)alkylaminocarbonyl; or $R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and $R^3$, $R^4$, $R^5$, and $R^6$ are independently of each other selected from the group consisting of H and $C_1$-$C_4$-alkyl.

The organic moieties mentioned in the above definitions of the variables are collective terms for individual listings of the individual group members. The prefix $C_n$-$C_m$ indicates in each case the possible number of carbon atoms in the group.

The term "alkyl" as used herein denotes in each case a straight-chain or branched alkyl group having usually from 1 to 20 carbon atoms, preferably from 1 to 10 carbon atoms, frequently from 1 to 6 carbon atoms, more preferably 1 to 4 carbon atoms, e.g. 3 or 4 carbon atoms. Examples of alkyl groups are methyl, ethyl, n-propyl, iso-propyl, n-butyl, 2-butyl, iso-butyl, tert-butyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. Preferred alkyl groups are methyl, ethyl, n-propyl, isopropyl, n-butyl, isobutyl, sec-butyl, tert-butyl, n-pentyl, isopentyl, neopentyl, tert-pentyl, hexyl, 2-methylpentyl, n-heptyl, n-octyl, 2-ethylhexyl, isooctyl, nonyl, isononyl, decyl, and isodecyl.

The term "cycloalkyl" as used herein denotes in each case a monocyclic cycloaliphatic radical having usually from 3 to 20 carbon atoms, preferably from 3 to 10 carbon atoms, more preferably from 3 to 6 carbon atoms, such as cyclopropyl, cyclobutyl, cyclopentyl, cyclohexyl, cycloheptyl, cyclooctyl, cyclononyl and cyclodecyl or cyclopropyl, cyclobutyl, cyclopentyl and cyclohexyl.

The term "aryl" includes mono-, bi- or tricyclic aromatic radicals having usually from 6 to 14, preferably 6, 10, or 14 carbon atoms. Exemplary aryl groups include phenyl, naphthyl and anthracenyl. Phenyl is preferred as aryl group.

The term "arylalkyl" refers to aryl as defined above, which is bonded via a $C_1$-$C_4$-alkyl group, in particular a methyl group (=arylmethyl), to the remainder of the molecule, examples including benzyl, 1-phenylethyl, 2-phenylethyl, etc.

The term "heterocycle" or "heterocyclyl" includes 5- or 6-membered monocyclic heterocyclic non-aromatic radicals. The heterocyclic non-aromatic radicals usually comprise 1 or 2 heteroatoms selected from N, O and S as ring members, where S-atoms as ring members may be present as S, SO or $SO_2$. Examples of 5- or 6-membered heterocyclic radicals comprise saturated or unsaturated, non-aromatic heterocyclic rings, such as oxiranyl, oxetanyl, thietanyl, thietanyl-S-oxid (S-oxothietanyl), thietanyl-S-dioxid (S-dioxothiethanyl), pyrrolidinyl, pyrrolinyl, pyrazolinyl, tetrahydrofuranyl, dihydrofuranyl, 1,3-dioxolanyl, thiolanyl, S-oxothiolanyl, S-dioxothiolanyl, dihydrothienyl, S-oxodihydrothienyl, S-dioxodihydrothienyl, oxazolidinyl, oxazolinyl, thiazolinyl, oxathiolanyl, piperidinyl, piperazinyl, pyranyl, dihydropyranyl, tetrahydropyranyl, 1,3- and 1,4-dioxanyl, thiopyranyl, S-oxothiopyranyl, S-dioxothiopyranyl, dihydrothiopyranyl, S-oxodihydrothiopyranyl, S-dioxodihydrothiopyranyl, tetrahydrothiopyranyl, S-oxotetrahydrothiopyranyl, S-dioxotetrahydrothiopyranyl, morpholinyl, thiomorpholinyl, S-oxothiomorpholinyl, S-dioxothiomorpholinyl, thiazinyl and the like. Preferred examples of heterocyclic radicals are piperazinyl, morpholinyl, pyrrolyl, pyrazolyl, triazolyl, oxazolyl, thiazolyl, and imidazolyl groups.

The term "(di)alkylaminocarbonyl" refers to a (di)alkylamino group, i.e. an amino group comprising 1 or 2 alkyl substituents, which is bonded to the remainder of the molecule via the carbon atom of a carbonyl group (C═O).

It is to be understood that, preferably, also stereoisomers, tautomers, N-oxides, and salts of the (thio)phosphoric acid triamides are covered by the term "(thio)phosphoric acid triamide". Stereoisomers are present, if the compounds contain one or more centers of chirality. In this case, the compounds will be present in the form of different enantiomers or diastereomers, if more than one center of chirality is present. The term "(thio)phosphoric acid triamide" preferably covers every possible stereoisomer, i.e. single enantiomers or diastereomers, as well as mixtures thereof. Tautomers include, e.g., keto-enol tautomers. N-oxides may be formed under oxidative conditions, if tertiary amino groups are present. Salts may be formed, e.g., with the basic amino groups of the (thio)phosphoric acid triamides. Anions, which stem from an acid, with which the (thio)phosphoric acid amide may have been reacted, are e.g. chloride, bromide, fluoride, hydrogensulfate, sulfate, dihydrogenphosphate, hydrogenphosphate, phosphate, nitrate, bicarbonate, carbonate, hexafluorosilicate, hexafluorophosphate, benzoate, and the anions of $C_1$-$C_4$-alkanoic acids, preferably formate, acetate, propionate and butyrate.

In a preferred embodiment, the (thio)phosphoric acid triamide (2) may be represented by the following general formula (I)

(I)

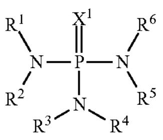

wherein $X^1$ is O or S;

$R^1$ is $C_1$-$C_8$-alkyl, $C_5$-$C_6$-cycloalkyl, phenyl, or benzyl;

$R^2$ is H, or $C_1$-$C_4$-alkyl; and $R^3$, $R^4$, $R^5$, and $R^6$ are each H.

Preferably, the (thio)phosphoric acid triamide (2) may be represented by the above formula ( ), wherein $X^1$ is S;

$R^1$ is $C_1$-$C_8$-alkyl, $C_5$-$C_6$-cycloalkyl, phenyl, or benzyl;

$R^2$ is H or $C_1$-$C_4$-alkyl; and $R^3$, $R^4$, $R^5$, and $R^6$ are each H;

and wherein even more preferably $X^1$ is S;

$R^1$ is $C_1$-$C_8$-alkyl;

$R^2$ is H or $C_1$-$C_4$-alkyl; and $R^3$, $R^4$, $R^5$, and $R^6$ are each H.

It is to be understood that the term "(thio)phosphoric acid triamide (2)" may also cover combinations of (thio)phosphoric acid triamides (2) according to formula (I) as defined above.

In one embodiment of the invention, the (thio)phosphoric acid triamide (2) is selected from the group consisting of N-benzyl-N-methylthiophosphoric acid triamide, N,N-diethylthiophosphoric acid triamide, N-(n-butyl)thiophosphoric acid triamide, N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl) phosphoric acid triamide, N-(n-butyl)-phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide, and combinations thereof.

In one embodiment of the invention, the (thio)phosphoric acid triamide (2) is N-n-butylthiophosphoric acid triamide (NBPT), N-n-propylthiophosphoric acid triamide (NPPT), or a combination thereof.

In one preferred embodiment of the invention, the (thio) phosphoric acid triamide (2) is N-n-propylthiophosphoric acid triamide (NPPT) having the following chemical formula:

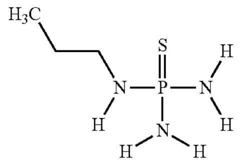

In another preferred embodiment of the invention, the (thio)phosphoric acid triamide (2) is N-n-butylthiophosphoric acid triamide (NBPT) having the following chemical formula:

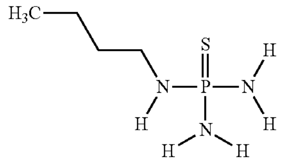

In yet another preferred embodiment of the invention, the (thio)phosphoric acid triamide (2) is a combination of N-n-butylthiophosphoric acid triamide (NBPT) and N-n-propylthiophosphoric acid triamide (NPPT). It is particularly preferred that the (thio)phosphoric acid triamide (2) is a combination of NBPT and NPPT, which comprises NBPT in amounts of from 40 to 95 wt.-%, more preferably from 60 to 85 wt.-%, particularly preferably from 72 to 80 wt.-%, in each case based on the total weight of the combination.

In connection with the above defined method according to the invention, it is generally preferred that the (thio)phosphoric acid triamide (2) is provided in combination with at least one amine having a boiling point of more than 100° C. In the present patent application, the at least one amine having a boiling point of more than 100° C. is referred to as "amine (4)". The amine (4) typically exhibits a stabilizing effect on the (thio)phosphoric acid triamide (2) in terms of a decomposition caused by the urea-containing fertilizer (1).

Thus, the (thio)phosphoric acid triamide (2) is provided preferably in combination with a (thio)phosphoric acid triamide (2) and an amine (4).

In general, the amine(s) (4) can be any amine having a boiling point of more than 100° C., i.e. any chemical compound having at least one amino group, including (but not limited to)

primary, secondary, and tertiary amines, linear, branched, and cyclic amines, aliphatic and aromatic amines, monomeric, oligomeric and polymeric amines, biogenic and non-biogenic amines.

In a preferred embodiment of the invention, the (thio) phosphoric acid triamide (2) is provided in combination with at least one amine (4) selected from the group consisting of (4a) a polymeric polyamine; and (4b) an amine containing not more than one amino group and at least three alkoxy or hydroxy-substituted $C_2$ to $C_{12}$ alkyl groups $R^{21}$, wherein at least one of the groups $R^{21}$ is different to the other groups $R^{21}$; and (4c) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$; and (4d) an amine containing at least one saturated or unsaturated $C_8$ to $C_{40}$ alkyl group $R^{23}$; and (4e) a saturated or unsaturated heterocyclic amine which contains at least one oxygen atom as ring atom and which does not contain a further alkoxy group; and (4f) an amine having a boiling point of more than 100° C., preferably more than 150° C., more preferably more than 200° C. at ambient pressure (1 bar), and (4g) a primary amine, and (4h) a secondary amine, and (4i) a tertiary amine, (4j) an amine containing not more than one amino group and at least two alkoxy- or hydroxy-substituted $C_2$ to $C_{12}$ alkyl groups $R^{22}$, (4k) an amine containing not more than one amino group and at least three alkoxy- or hydroxy-substituted $C_2$ to $C_{12}$ alkyl groups $R^{22}$, (4j) an amine containing not more than one amino group and at least three alkoxy- or hydroxy-substituted $C_2$ to $C_{12}$ alkyl groups $R^{41}$, wherein all groups $R^{41}$ within said amine are identical, and (4m) an amine containing not more than one amino group and at least two alkoxy- or hydroxy-substituted $C_2$ to $C_{12}$ alkyl groups $R^{42}$, wherein at least one of the groups $R^{42}$ bears the alkoxy or hydroxy substituent at a secondary or tertiary carbon atom and wherein all groups $R^{42}$ with said amine are identical, and (4n) an amine selected from the group consisting of methyldiethanolamine, tetrahydroxypropylethylenediamine, trimethylaminoethylethanolamine, N,N,N',N'-tetramethyl-1,6-hexanediamine, N,N',N"-tris(dimethylaminopropyl)hexahydrotriazine, and 2,2'-dimorpholinyldiethyl ether, and (4o) an amine selected from the group consisting of (L10), (L11), (L12), (L13), (L14), (L15), (L16), (L17), (L18), (L19), (L20), (L21), (L22), (L23), (L24) and (L29) as disclosed in WO2016/103168.

According to one embodiment, the amine (4) is (4a) a polymeric polyamine.

Generally, (4a) can be any polymeric polyamine, and is preferably a polyalkyleneimine or polyvinylamine, more preferably a polyalkyleneimine, most preferably a polyethyleneimine, polypropyleneimine, or polybutyleneimine, particularly a polyethyleneimine.

According to one embodiment, (4a) is preferably any polymeric polyamine comprising ethyleneimine ($—CH_2CH_2NH—$) as monomeric units, including homopolymers and any copolymers of ethyleneimine, and is preferably a homopolymer of ethyleneimine. Copolymers can be alternating, periodic, statistical or block copolymers.

Generally, (4a) can be of any polymer structure, for example a linear polymer, a ring polymer, a cross-linked polymer, a branched polymer, a star polymer, a comb polymer, a brush polymer, a dendronized polymer, or a dendrimer etc. According to one embodiment, (4a) is an essentially linear polymer, and is preferably a linear polymer.

Polyethyleneimines which may be used are polyethyleneimine homopolymers which may be present in uncrosslinked or crosslinked form. The polyethyleneimine homopolymers can be prepared by known processes, as described, for example, in Römpps (Chemie Lexikon, 8th edition, 1992, pages 3532-3533), or in Ullmanns Enzyklopädie der Technischen Chemie, 4th edition, 1974, vol. 8, pages 212-213. and the literature stated there. They have a molecular weight in the range from about 200 to 1 000 000 g/mol. Corresponding commercial products are for example available under the name Lupasol® from BASF SE.

According to one embodiment of the invention, the polyethyleneimine (4a) is preferably a polyethylenimine having a degree of branching in the range of from 0.1 to 0.95 (also referred to as "highly branched polyethyleneimine"), and more preferably a polyethylenimine having a degree of branching in the range of from 0.25 to 0.90, more preferably a polyethylenimine having a degree of branching in the range of from 0.30 to 0.80, und most preferably a polyethylenimine having a degree of branching in the range of 0.50 to 0.80.

Highly branched polyethyleneimines are characterized by its high degree of branching, which can be determined for example via $^{13}C$-NMR spectroscopy, preferably in $D_2O$, and is defined as follows:

$$\text{Degree of branching}=D+T/D+T+L$$

D (dendritic) equals the percentage of tertiary amino groups, L (linear) equals the percentage of secondary amino groups, and T (terminal) equals the percentage of primary amino groups.

Generally, the polymeric polyamine (4a) can have different weight average molecular weights. The weight average molecular weight of (4a) is preferably at least 200, more preferably at least 400, most preferably at least 550, particularly at least 650, for example at least 750. The weight average molecular weight of (4a) is preferably not more than 10,000, more preferably not more than 4,000, most preferably not more than 1,900, particularly not more than 1,500, for example not more than 1,350. The weight average molecular weight can be determined by standard gel permeation chromatography (GPC) known to the person skilled in the art.

In one embodiment, the amine (4) is a polyethyleneimine, preferably a polyethyleneimine as defined above.

Another class of polyamines includes polymers obtainable by condensation of at least one compound selected from N-(hydroxyalkyl)amines of formulae (I.a) and/or (I.b), (I.a)

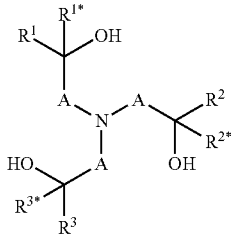

(I.b)

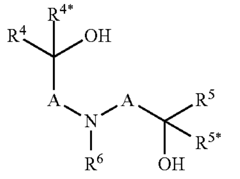

wherein

A are independently selected from $C_1$-$C_6$-alkylene;

$R^1$, $R^{1*}$, $R^2$, $R^{2*}$, $R^3$, $R^{3*}$, $R^4$, $R^{4*}$, $R^5$, and $R^{5*}$ are independently selected of one another selected from hydrogen, alkyl, cycloalkyl or aryl, wherein the at least three mentioned radicals may be optionally substituted; and $R^6$ is selected from hydrogen, alkyl, cycloalkyl or aryl, which may be optionally substituted.

Preferred are polyethanolamines. In this connection, polyethanolamines are preferred, wherein in the condensation product of the compounds of formulae (I.a) and/or (I.b) as defined above, A is $C_1$-alkylene, and $R^1$, $R^{1*}$, $R^2$, $R^{2*}$, $R^3$, $R^{3*}$, $R^4$, $R^{4*}$, $R^5$, and $R^{5*}$ are each H, and $R^6$ is selected from hydrogen and $C_2$-hydroxyalkyl.

In one preferred embodiment, the polyamine is a polyethanolamine, which is commercially available under the trade name Lupasol® EO.

According to another embodiment, the amine (4) is (4b) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$.

The number of groups $R^{21}$ within (4b) is at least 3, preferably 3 to 5, more preferably 3 to 4, and most preferably 3.

The number of carbon atoms in each group $R^{21}$ within (4b) is 2 to 12, preferably 2 to 9, more preferably 2 to 7, most preferably 2 to 5, particularly preferably 2 to 4, particularly 2 to 3, for example 3, wherein said number of carbon atoms does not include carbon atoms in any alkoxy groups or any other substituents of $R^{21}$.

The groups $R^{21}$ within (4b) are alkoxy- or hydroxy-substituted, preferably hydroxy-substituted.

For one amine (4b), among the at least three groups $R^{21}$, at least one of the groups $R^{21}$ is different to the other groups $R^{21}$, preferably one of the groups $R^{21}$ is different to the other groups $R^{21}$.

Preferably at least one of the groups $R^{21}$, more preferably at least two of the groups $R^{21}$, most preferably at least three of the groups $R^{21}$, particularly all groups $R^{21}$ is or are covalently bound to the amino group of the amine (4b).

According to another preferred embodiment, (4b)

is an amine containing not more than one amino group and at least three hydroxy-substituted $C_2$ to $C_8$- or preferably $C_2$ to $C_5$-alkyl groups $R^{21}$, wherein at least one of the groups $R^{21}$ is different to the other groups $R^{21}$, is preferably an amine containing not more than one amino group and at least three hydroxy-substituted $C_2$ to $C_3$ alkyl groups $R^{21}$, wherein at least one of the groups $R^{21}$ is different to the other groups $R^{21}$, is more preferably an amine containing not more than one amino group and three hydroxy-substituted $C_2$ to $C_3$ alkyl groups $R^{21}$ which are covalently bound to the amino group, wherein one of the groups $R^{21}$ is different to the other groups $R^{21}$, and is for example an amine selected from the group consisting of Bis(hydroxyethyl)-isopropanolamine (DEIPA), and 1,1'-((2-Hydroxyethyl)imino)dipropan-2-ol.

According to another preferred embodiment, (4b) is an amine $N(R^{21})_3$ wherein $R^{21}$ is a an alkoxy- or hydroxy-substituted—preferably a hydroxyl-substituted—$C_2$ to $C_{12}$- preferably a $C_2$ to $C_7$, more preferably a $C_2$ to $C_3$-alkyl group and wherein one of the groups $R^{21}$ is different to the other group $R^{21}$.

According to another preferred embodiment, (4b) is an amine $N(R^{21})_3$ wherein $R^{21}$ is a an alkoxy- or hydroxy-substituted—preferably a hydroxyl-substituted—$C_2$ to $C_{12}$- preferably a $C_2$ to $C_7$, more preferably a $C_2$ to $C_3$-alkyl group and wherein one of the groups $R^{21}$ is different to the other group $R^{21}$ and wherein at least one of the groups $R^{21}$ bears the alkoxy or hydroxy substituent at a secondary or tertiary carbon atom.

According to another embodiment, the amine (4) is (4c) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$.

The number of groups $R^{22}$ within (4c) is at least 2, preferably 2 to 5, more preferably 2 to 4, and most preferably 2 to 3, for example 2.

The number of carbon atoms in each group $R^{22}$ within (4c) is 2 to 12, preferably 2 to 9, more preferably 2 to 7, most preferably 2 to 5, particularly preferably 2 to 4, particularly 2 to 3, for example 3, wherein said number of carbon atoms does not include carbon atoms in any alkoxy groups or any other substituents of $R^{22}$.

The groups $R^{22}$ within (4c) are alkoxy- or hydroxy-substituted, preferably hydroxy-substituted.

For one amine (4c), among the at least two groups $R^{22}$, at least one of the groups $R^{22}$ is different to the other group(s) $R^{22}$, preferably one of the groups $R^{22}$ is different to the other group(s) $R^{22}$.

Preferably at least one of the groups $R^{22}$, more preferably at least two of the groups $R^{22}$, most preferably all groups $R^{22}$ is or are covalently bound to the amino group of the amine (4c).

Preferably at least one of the groups $R^{22}$, more preferably one of the groups $R^{22}$ bears the alkoxy or hydroxy substituent at a secondary or tertiary carbon atom, particularly at a secondary carbon atom.

According to another preferred embodiment, (4c)

is an amine containing not more than one amino group and at least two hydroxy-substituted $C_2$ to $C_7$ alkyl groups $R^{22}$, wherein at least one of the groups $R^{22}$ bears the hydroxy substituent at a secondary or tertiary carbon atom and wherein at least one of the groups $R^{22}$ is different to the other group(s) $R^{22}$, is more preferably an amine containing not more than one amino group and at least two hydroxy-substituted $C_2$ to $C_4$ alkyl groups $R^{22}$, wherein at least one of the groups $R^{22}$ bears the hydroxy substituent at a secondary carbon atom and wherein at least one of the groups $R^{22}$ is different to the other group(s) $R^{22}$, is most preferably an amine containing not more than one amino group and two hydroxy-substituted $C_2$ to $C_3$ alkyl groups $R^{22}$ which are covalently bound to the amino group of the amine (4c), wherein at least one of the groups $R^{22}$ bears the hydroxy substituent at a secondary carbon atom and wherein one of the groups $R^{22}$ is different to the other group $R^{22}$, is for example an amine selected from the group consisting of 1-((2-hydroxyethyl)amino)-propan-2-ol, and N-Methyl-N-hydroxyethyl-isopropanolamine.

According to another preferred embodiment, (4c) is an amine $R^{24}N(R^{22})_2$ wherein $R^{24}$ is H or a $C_1$ to $C_{12}$-, preferably a $C_1$ to $C_7$-, more preferably a $C_1$ to $C_3$-alkyl group and $R^{22}$ is an alkoxy- or hydroxy-substituted-, preferably a hydroxy-substituted-$C_2$ to $C_{12}$-, preferably $C_2$ to $C_7$-, more preferably $C_2$ to $C_3$-alkyl group and wherein at least one of the groups $R^{22}$ bears the hydroxy substituent at a secondary carbon atom and wherein one of the groups $R^{22}$ is different to the other group $R^{22}$.

According to another embodiment, the amine (4) is (4d) an amine containing at least one saturated or unsaturated $C_8$ to $C_{40}$ alkyl group $R^{23}$.

The number of carbon atoms in each group $R^{23}$ within (4d) is 8 to 40, preferably 8 to 32, more preferably 8 to 24, most preferably 8 to 19, particularly preferably 8 to 16.

The group $R^{23}$ within (4d) is saturated or unsaturated, preferably unsaturated.

According to another preferred embodiment, (4d) contains at least one alkoxy or hydroxy group, more preferably at least one alkoxy and at least one hydroxy groups, most preferably at least two alkoxy and at least one hydroxyl group, particularly at least four alkoxy and at least one hydroxyl group.

For example, (4d) is an amine selected from the group consisting of: ethoxylated (2) cocoalkylamine, ethoxylated (5) cocoalkylamine, ethoxylated (15) cocoalkylamine, ethoxylated (2) oleylamine, lauryl-dimethylamine, oleyl-dimethylamine, and 2-propylheptylamine ethoxylate (5 EO), 2-propylheptylamine ethoxylate (10 EO), and 2-propylheptylamine ethoxylate (20 EO).

In one preferred embodiment, the amine (4) is ethoxylated (2) cocoalkylamine.

In one preferred embodiment, the amine (4) is ethoxylated (5) cocoalkylamine.

In one preferred embodiment, the amine (4) is ethoxylated (15) cocoalkylamine.

In one preferred embodiment, the amine (4) is ethoxylated (2) oleylamine.

In one preferred embodiment, the amine (4) is auryl-dimethylamine.

In one preferred embodiment, the amine (4) is oleyl-dimethylamine.

In one preferred embodiment, the amine (4) is 2-propylheptylamine ethoxylate (5EO).

In one preferred embodiment, the amine (4) is 2-propylheptylamine ethoxylate (10 EO)

In one preferred embodiment, the amine (4) is 2-propylheptylamine ethoxylate (20 EO).

According to another embodiment, the amine (4) is (4e) a saturated or unsaturated heterocyclic amine which contains at least one oxygen atom as ring atom and which does not contain a further alkoxy group.

The term "heterocyclic amine" stands for a heterocyclic compound in which at least one ring atom of the heterocyclic ring is a nitrogen atom.

The heterocyclic amine (4e) is saturated or unsaturated, preferably saturated.

The heterocyclic amine (4e) contains preferably a 5-, 6- or 7-membered heterocyclic ring, more preferably a 5- or 6-membered ring, most preferably a 6-membered ring.

The heterocyclic amine (4e) contains at least one, more preferably 1 to 3, most preferably 1 to 2, particularly one oxygen atom(s) as ring atom(s) of the heterocyclic ring.

The heterocyclic amine (4e) is preferably a morpholine or morpholine derivative, more preferably N-alkyl morpholine, most preferably N-methyl, N-ethyl, N-propyl, or N-butyl morpholine, for example N-methyl morpholine.

In one preferred embodiment, the amine (4) is N-methyl morpholine.

According to another embodiment, the amine (4) is (4f) an amine having a boiling point of more than 100° C., preferably more than 150° C., more preferably more than 200° C. at ambient pressure (1 bar).

Such amines are described in US 2011/0154874 A1. Accordingly, preferred amines (4f) are secondary and/or tertiary amines, for example methyldiethanolamine, tetrahydroxypropylethylenediamine, trimethylaminoethylethanolamine, N,N,N',N'-tetramethyl-1,6-hexanediamine, N,N',N"-tris(dimethylaminopropyl)hexahydrotriazine, and 2,2'-dimorpholinyldiethyl ether.

According to another embodiment, the amine (4) is (4g) a primary amine.

According to another embodiment, the amine (4) is (4h) a secondary amine.

According to another embodiment, the amine (4) is (4i) a tertiary amine.

In connection with the above embodiments relating to (4g), (4h) and (4i), the term "amine" is preferably to be understood as an organic compounds, in which at least one amino group is bound to a carbon atom. In a primary amine, an $NH_2$ group is bound to a carbon atom, in a secondary amine an $NR^AH$ group is bound to a carbon atom, and in a tertiary amine an $NR^AR^B$ group is bound to a carbon atom, wherein $R^A$ and $R^B$ may each individually be selected from $C_1$-$C_{20}$-alkyl, di($C_1$-$C_4$-alkyl)amino-$C_1$-$C_{20}$-alkyl, and a $C_1$-$C_4$-alkylene chain, which is bound to the carbon atom to which the $NR^AH$ or $NR^AR^B$ group is bound so that a heterocyclic ring is formed, or $R^A$ and $R^B$ may together with the nitrogen atom to which they are bound form a 5- to 10-membered, preferably 5- to 6-membered heterocyclic ring, wherein the heterocycle may comprise 1, 2, or 3 additional nitrogen atoms, and wherein the N atoms if present are each individually further substituted by H, $C_1$-$C_4$-alkyl, di($C_1$-$C_4$-alkyl)amino-$C_1$-$C_4$-alkyl, or by a $C_1$-$C_4$-alkylene chain, which is bound to the carbon atom to which the $NR^AR^B$ group is bound, so that a further heterocyclic ring is formed. If the carbon atom to which the $NH_2$, $NR^AH$, or $NR^AR^B$ group is bound is not part of a heterocyclic ring, which is formed with $R^A$ or $R^B$ it is preferably part of a $C_1$-$C_{20}$-alkyl group or a di($C_1$-$C_4$-alkyl)amino-$C_1$-$C_{20}$-alkyl group, so that the amino group may be represented by the formula $C_1$-$C_{20}$-alkyl-$NH_2$, $C_1$-$C_{20}$-alkyl-$NR^AH$, or $C_1$-$C_2$-alkyl-$NR^AR^B$ or by the formula di($C_1$-$C_4$-alkyl)amino-$C_1$-$C_{20}$-alkyl-$NH_2$, di($C_1$-$C_4$-alkyl)amino-$C_1$-$C_{20}$-alkyl-$NR^AH$, or di($C_1$-$C_4$-alkyl)amino-$C_1$-$C_{20}$-alkyl-$NR^AR^B$, wherein $R^A$ and $R^B$ may each individually be selected from $C_1$-$C_{20}$-alkyl, and di($C_1$-$C_4$-alkyl)amino-$C_1$-$C_{20}$-alkyl, or $R^A$ and $R^B$ may together with the nitrogen atom to which they are bound form a 5- to 10-membered, preferably 5- to 6-membered heterocyclic ring, wherein the heterocycle may comprise 1, 2, or 3 additional heteroatoms nitrogen atoms, and wherein the N atoms if present are each individually further substituted by H, $C_1$-$C_4$-alkyl, or di($C_1$-$C_4$-alkyl)amino-$C_1$-$C_4$-alkyl.

In one preferred embodiment of the invention, the amine (4) is a tertiary amine, wherein 2 tertiary amino groups are present, and which may be represented by the formula $R^aR^bN$—($C_1$-$C_{10}$-alkylene)-$NR^cR^d$, wherein $R^a$, $R^b$, $R^c$, and $R^d$ are independently of each other selected from $C_1$-$C_4$-alkyl, or $R^a$ and $R^b$ and/or $R^c$ and $R^d$ may together with the nitrogen atom to which they are bound form a 5- to 10-membered, preferably 5- to 6-membered heterocyclic ring, wherein the heterocycle may comprise 1, 2, or 3 additional heteroatoms selected from N, O, and S, wherein the N atom if present is further substituted by $C_1$-$C_4$-alkyl. Preferably, $R^a$, $R^b$, $R^c$, and $R^d$ are independently of each other selected from $C_1$-$C_4$-alkyl.

In one embodiment of the invention, the amine (4) is selected from N,N,N',N'-tetramethyl-1,6-hexanediamine, N,N,N',N'-tetramethyl-1,3-propanediamine, N,N',N"-tris(dimethylaminopropyl)-hexahydrotriazine, and triethylendiamine (DABCO).

In one preferred embodiment of the invention, the amine (4) is N,N,N',N'-tetramethyl-1,6-hexanediamine (CAS [111-18-2]).

In one preferred embodiment of the invention, the amine (4) is N,N,N',N'-tetramethyl-1,3-propanediamine (CAS [110-95-2]).

In one preferred embodiment of the invention, the amine (4) is N,N',N"-tris(dimethylaminopropyl)hexahydrotriazine.

In one preferred embodiment of the invention, the amine (4) is triethylendiamine (DABCO, available as Lupragen® N201 from BASF).

According to another embodiment, the amine (4) is (4j) an amine containing not more than one amino group and at least two alkoxy- or hydroxy-substituted $C_2$ to $C_{12}$ alkyl groups $R^{22}$.

According to another embodiment, the amine (4) is (4k) an amine containing not more than one amino group and at least three alkoxy- or hydroxy-substituted $C_2$ to $C_{12}$ alkyl groups $R^{22}$.

According to another embodiment, the amine (4) is (4l) an amine containing not more than one amino group and at least three alkoxy- or hydroxy-substituted $C_2$ to $C_{12}$ alkyl groups $R^{41}$, wherein all groups $R^{41}$ within said amine are identical.

According to another embodiment, the amine (4) is (4m) an amine containing not more than one amino group and at least two alkoxy- or hydroxy-substituted $C_2$ to $C_{12}$ alkyl groups $R^{42}$, wherein at least one of the groups $R^{42}$ bears the alkoxy or hydroxy substituent at a secondary or tertiary carbon atom and wherein all groups $R^{42}$ with said amine are identical.

In the context of the above embodiments (4j) to (4m), the amine (4) may in one embodiment be an amino alcohol.

Amino alcohols may also be referred to as alkanol amines and are characterized in that they comprise at least one hydroxyl group and at least one amino group.

In one embodiment, amino alcohols may be represented by the formula $(H)_aN(C_1\text{-}C_{10}\text{-hydroxyalkyl})_b$, preferably by the formula $(H)_aN(C1\text{-}C_8\text{-hydroxyalkyl})_b$, wherein a is 0 or 1, and b is 2 when a is 1 and 3 when a is 0. In this connection, it is to be understood that the term “hydroxyalkyl” defines an alkyl group, which comprises at least one, preferably 1, 2, or 3 hydroxyl groups, especially preferably one hydroxyl group. Exemplary hydroxyalkyl groups include hydroxymethyl, 2-hydroxyethyl, 2-hydroxypropyl, and 3-hydroxypropyl.

In one embodiment, it is preferred that the amino alcohol comprises not more than one amino group and at least three hydroxyl substituted $C_2$-$C_8$-, preferably $C_2$-$C_5$-alkyl groups, wherein at least one of these hydroxyl substituted alkyl groups is different from the other hydroxyl substituted alkyl groups.

It is even more preferred that the amino alcohol comprises not more than one amino group and at least three hydroxyl substituted $C_2$-$C_3$-alkyl groups, wherein at least one of these hydroxyl substituted alkyl groups is different from the other hydroxyl substituted alkyl groups.

It is even more preferred that the amino alcohol comprises not more than one amino group and at least three hydroxyl-substituted $C_2$-$C_3$-alkyl groups, which are covalently bound to the amino group, wherein at least one of these hydroxyl substituted alkyl groups is different from the other hydroxyl substituted alkyl groups.

In other embodiments of the invention, amino alcohols may be represented by the generic formula A $(H)_xN((CH_2)_m—OH)_n$, wherein m is 1, 2, or 3, x is 0 or 1, and n is 2 when x is 1 and 3 when x is 0, or by generic formula B $(H)_yN((CH_2)—CHOH—CH_3)_z$, such that the length of the carbon chain where the secondary hydroxyl group is located is 3, y is 0 or 1, and z is 2 when y is 1 and 3 when y is 0.

In another embodiment of the invention, amino alcohols may be represented by the formula $(C_1\text{-}C_4\text{-alkyl})_2N—(C_1\text{-}C_4\text{-alkylene})\text{-}N(C_1\text{-}C_4\text{-alkyl})(C_1\text{-}C_4\text{-hydroxyalkyl})$. An exemplary amino alcohol in this connection is N,N,N'-trimethylaminoethylethanolamine.

Preferred amino alcohols according to the invention may be selected from the group consisting of ethanolamine, diethanolamine, methyl diethanolamine, butyl diethanolamine, monoisopropanolamine, diisopropanolamine, methyl diisopropanolamine, triethanolamine, tetrahydroxypropylethylenediamine, trimethylaminoethylethanolamine, N,N-bis(2-hydroxyethyl)isopropanolamine, N,N,N'-trimethylaminoethylethanolamine, and N,N,N',N'-tetrakis(2-hydroxypropyl)ethylenediamine.

Preferred amino alcohols according to the invention include ethanolamine, diethanolamine, methyl diethanolamine, butyl diethanolamine, monoisopropanolamine, diisopropanolamine, methyl diisopropanolamine, triethanolamine, tetrahydroxypropylethylenediamine, and trimethylaminoethylethanolamine.

A preferred amino alcohol is triethanolamine.

Another preferred amino alcohol is N,N-bis(2-hydroxyethyl)isopropanolamine, also known as diethanolisopropanolamine (DEIPA).

Another preferred amino alcohol is N,N,N'-trimethylaminoethylethanolamine (CAS [2212-32-0], available as Lupragen® N400 from BASF).

Another preferred amino alcohol is N,N,N',N'-tetrakis(2-hydroxypropyl)ethylenediamine (CAS [102-60-3]).

In the context of the above embodiments (4j) to (4m), the amine (4) may in another embodiment be an ether amine.

Ether amines are characterized in that they comprise at least one ether group and at least one amino group.

In one embodiment of the invention, the ether amines may be represented by the generic formula $NR^aR^b—(CH_2)_n—[O—(CH_2)_m]_p—NR^cR^d$, wherein n is 1, 2, 3, 4, or 5, m is 1, 2, 3, 4, or 5, p is 1, 2, 3, 4, or 5, and $R^a$, $R^b$, $R^c$, and $R^d$ are independently of each other selected from H and $C_1$-$C_4$-alkyl, or $R^a$ and $R^b$ and/or $R^c$ and $R^d$ may together with the nitrogen atom to which they are bound form a 5- to 10-membered, preferably 5- to 6-membered heterocyclic ring, wherein the heterocycle may comprise 1, 2, or 3 additional heteroatoms selected from N, O, and S, wherein the N atom if present is further substituted by H or $C_1$-$C_4$-alkyl. Preferably n is 1 or 2, m is 1 or 2, p is 1 or 2, $R^a$, $R^b$, $R^c$, and $R^d$ are each independently selected from $C_1$-$C_2$-alkyl, or $R^a$ and $R^b$ and $R^c$ and $R^d$ each together with the nitrogen atom to which they are bound form a 5- or 6-membered heterocyclic ring, wherein the heterocycle may comprise 1 additional heteroatom selected from N, O, and S, wherein the N-atom if present is further substituted by a $C_1$-$C_2$-alkyl group.

In one embodiment of the invention, the ether amines are heterocyclic 5- to 10-membered, preferably 5- or 6-membered rings comprising an oxygen atom and a nitrogen atom to form the required amino and ether groups, and wherein the nitrogen atom is further substituted by H, $C_1$-$C_{10}$-alkyl, $C_1$-$C_{10}$-haloalkyl, C(═O)H, or C(═O)$C_1$-$C_{10}$-alkyl. Particularly preferred are morpholine compounds, wherein the nitrogen atom is substituted by $C_1$-$C_4$-alkyl, $C_1$-$C_4$-haloalkyl, C(═O)H, or C(═O)$C_1$-$C_4$-alkyl, preferably by $C_1$-$C_4$-alkyl, C(═O)H, or C(═O)$CH_3$.

Preferred ether amines include dimorpholinodiethylether, bis(2-dimethyl-aminoethyl)ether, N-acetylmorpholine, and N-formylmorpholine.

In one preferred embodiment of the invention, the amine (4) is dimorpholinodiethylether (available as Lupragen© N106 from BASF).

In one preferred embodiment of the invention, the amine (4) is bis(2-dimethyl-aminoethyl)ether (CAS [3033-62-3], available as Lupragen® N205 from BASF).

In one preferred embodiment of the invention, the amine (4) is a morpholine compound selected from N-acetylmorpholine and N-formylmorpholine.

The amines (4l) or (4m) are preferably (L217) triethanolamine, (L218) tripropanolamine, (L219) diisopropanolamine, (L220) triisopropanolamine, (L221) diethanolamine, or (L222) methyldipropanolamine.

In one preferred embodiment, the amine (4) is (L217) triethanolamine.

In another preferred embodiment, the amine (4) is (L218) tripropanolamine.

In another preferred embodiment, the amine (4) is (L219) diisopropanolamine.

In another preferred embodiment, the amine (4) is (L220) triisopropanolamine.

In another preferred embodiment, the amine (4) is (L221) diethanolamine.

In another preferred embodiment, the amine (4) is (L222) methyldipropanolamine.

According to another embodiment, the amine (4) is (4n) an amine selected from the group consisting of methyldiethanolamine, tetrahydroxypropylethylenediamine, trimethylaminoethylethanolamine, N,N,N',N'-tetramethyl-1,6-hexanediamine, N,N',N"-tris(dimethylaminopropyl)hexahydrotriazine, and 2,2'-dimorpholinyldiethyl ether.

In one embodiment, the amine (4) is methyldiethanolamine.

In one embodiment, the amine (4) is tetrahydroxypropylethylenediamine.

In one embodiment, the amine (4) is trimethylaminoethylethanolamine.

In one embodiment, the amine (4) is N,N,N',N'-tetramethyl-1,6-hexanediamine.

In one embodiment, the amine (4) is N,N',N"-tris(dimethylaminopropyl)hexahydrotriazine.

In one embodiment, the amine (4) is 2,2'-dimorpholinyldiethyl ether.

According to another embodiment, the amine (4) is (4o) an amine selected from the group consisting of (L10), (L11), (L12), (L13), (L14), (L15), (L16), (L17), (L18), (L19), (L20), (L21), (L22), (L23), (L24) and (L29) as disclosed in the PCT application WO2016/103168.

In one preferred embodiment, the amine (4) is (L10) an aliphatic alkylenediamine according to the general formula (IA)

(IA)

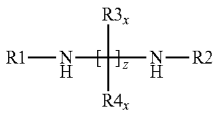

wherein the radicals are defined as follows:

$R^1$ and $R^2$ are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10; or alternatively $R^1$ and $R^2$ jointly represents a linear or branched $C_1$- to $C_{12}$-alkyl, $C_1$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10; and $R3_x$ and $R^4$ are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10; and $R^{10}$ is linear or branched $C_1$- to $C_{12}$-alkyl, $C_7$- to $C_{12}$-aralkyl, $C_6$- to $C_{10}$-aryl or $C_3$- to $C_8$-cycloalkyl; and z is a value from 2 to 20, preferably from 2 to 12; and x is an index which can assume all values from 1 to z.

In one preferred embodiment, the amine (4) is (L11) an oligomeric polyalkyleneamine according to the general formula (II)

(II)

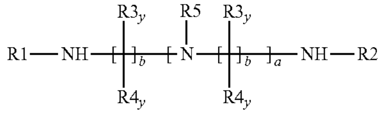

wherein the radicals are each defined as follows:

R1, R2 and R5 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10; or two of the three radicals $R^1$, $R^2$ and $R^5$ are covalently bonded to each other to form a linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10, and the remaining one of the three radicals $R^1$, $R^2$ and $R^5$ is hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10; and $R3_y$ and $R4_y$ are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10;

R10 is linear or branched $C_1$- to $C_{12}$-alkyl, $C_7$- to $C_{12}$-aralkyl, $C_6$- to $C_{10}$-aryl or $C_3$- to $C_8$-cycloalkyl;

a is a value of 2 to 5;

b is a value of 2 to 12;

and y is an index which can assume all values between 1 and b.

In one preferred embodiment, the amine (4) is (L12) a polyetheramine according to general formula (III):

(III)

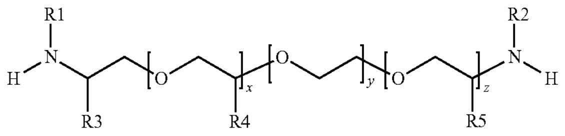

wherein the radicals are each defined as follows:

R1 and R2 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10;

alternatively $R^1$ and $R^2$ jointly represents a linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10; and R3, R4 and R5 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which optionally—preferably mandatorily—one or more $CH_2$ groups have been replaced by O, NH or NR10;

R10 is linear or branched $C_1$- to $C_{12}$-alkyl, $C_7$- to $C_{12}$-aralkyl, $C_6$- to $C_{10}$-aryl or $C_3$- to $C_8$-cycloalkyl;

x, y and z are each independently a value from 0 to 100 and the sum of x, y and z are at least 2.

In one preferred embodiment, the amine (4) is (L13) a polyvinylamine-related polymer selected from the group consisting of (L501) polyvinylamine, (L502) a polyvinylamine according to the general formula (IV)

(IV)

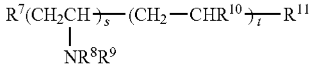

which has an average molar mass (Mw) of from 200 to 2,000,000 g/mol and wherein $R^7$ to $R^{11}$ are independently from each other hydrogen, linear or branched $C_1$- to $C_{20}$-alkyl, -alkoxy, -polyoxyethylene, -hydroxyalkyl, -(alkyl)carboxy, -phosphonoalkyl, -alkylamino radicals, formamidyl, pyrrolidonyl-, imidazolyl radicats, $C_2$- to $C_{20}$-alkenyl radicals or $C_6$- to $C_{20}$-aryl, -aryloxy, o-Hydroxybenzoyl, Phthalimidoyl, o-Carboxamidobenzoyl, o-($C_1$- to $C_8$-Alkoxycarbonyl)benzoyl, o-Aminobenzoyl, o-(Mono-$C_1$- to $C_8$-alkylamino)benzoyl, o-(Di-$C_1$- to $C_8$-alkylamino)benzoyl, 2-Cyano-3,3-diphenylacryloyl, or m-Benzimidazolyl-p-hydroxybenzoyl radicals which may be optionally further substituted, wherein s is an integer, t is 0 or an integer, wherein the sum of s and t must be chosen in such a way that the average molar mass is within the specified range, (L503) polyallylamine, (L504) poly(diallyldimethylammonium chloride), (L505) cationic polyvinylformamide, (L506) cationic polyvinylpyrrolidone, (L507) cationic polyvinylacetamide, (L508) cationic polyvinylmethylformamide, (L509) cationic polyvinylmethylacetamide, (L510) poly(dimethylaminopropylmethacrylamide), (L511) poly(dimethylaminoethyl acrylate), (L512) poly(diethylaminoethyl acrylate), (L513) poly(acryloylethyltrimethylammonium chloride), (L514) poly(acrylamido propyltrimethylammonium chloride), (L515) poly(methacrylamidotripropyltrimethylammonium chloride), (L516) cationic polyacrylamide, (L517) poly(vinylpyridine), (L518) hexadimethrine bromide, (L519) poly(dimethylamine-co-epichlorohydrin), (L520) poly(dimethylamine-co-epichlorohydrin-co-ethylenediamine), (L521) poly(amidoamine-epichlorohydrin), (L522) linear, branched or hyperbranched polyamidoamines, or (L523) polyamidoamines having an average molar mass (MW) of from 1,000 to 200,000 g/mol, and (L524) cationic starch, or copolymers which contain N-vinylformamide, allylamine, diallyldimethylammonium chloride, N-vinylacetamide, N-vinylpyrrolidone, N-methyl-N-vinylformamide, N-methyl-N-vinylacetamide, dimethylaminopropylmethacrylamide, dimethylaminoethyl acrylate, diethylaminoethyl acrylate, acryloylethyltrimethylammonium chloride or methacrylamidopropyltrimethylammonium chloride in the form of polymerized units and, if desired, in cleaved form, and the salts thereof when the polymers are basic polymers.

In one preferred embodiment, the amine (4) is (L14) a polyethyleneimine according to the general formula (V)

(V)

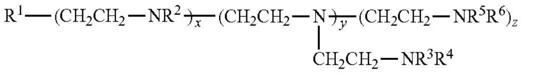

which has an average molar mass (MW) of from 200 to 1,000,000 g/mol and in which $R^1$ to $R^6$ are—independently from each other—hydrogen, linear or branched $C_1$ to $C_{20}$-alkyl, -alkoxy, -polyoxyalkylene, -polyoxyethylene, -hydroxyalkyl, -(alkyl)carboxy, -phosphonoalkyl, -alkylamino radicals, $C_2$- to $C_{20}$-alkenyl radicals or $C_6$- to $C_{20}$-aryl, -aryloxy, -hydroxyaryl, -arylcarboxy or -arylamino radicals which are optionally further substituted, and $R^2$, $R^3$ and $R^5$ may—independently from each other—optionally be each additionally further polyethyleneimine polymer chains, and $R^1$ may optionally be an $NR^3R^4$ or an $NH_2$ radical, and x, y and z are—independently from each other—0 or an integer, wherein the sum of x, y and z must be chosen in such a way that the average molar mass is within the specified range.

In one preferred embodiment, the amine (4) is (L15) a polyethyleneimine according to the general formula (V) wherein at least one of the radicals $R^2$ to $R^6$ is a polyoxyalkylene radical.

In one preferred embodiment, the amine (4) is a polymer obtainable by the process (L16P) comprising the step L16a)

L16a) condensation of at least one compound selected from N-(hydroxyalkyl)amines of formulae (I.a) and/or (I.b), (I.a)

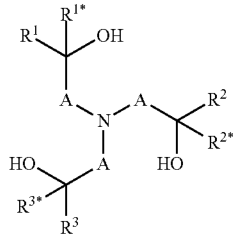

(I.b)

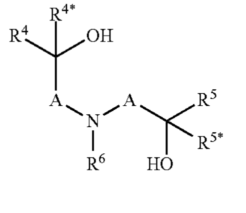

wherein

A are independently selected from $C_1$-$C_6$-alkylene;

$R^1$, $R^{1*}$, $R^2$, $R^{2*}$, $R^3$, $R^{3*}$, $R^4$, $R^{4*}$, $R^5$ and $R^{5*}$ are independently of one another selected from hydrogen, alkyl, cycloalkyl or aryl, wherein the last three mentioned radicals may be optionally substituted; and $R^6$ is selected from hydrogen, alkyl, cycloalkyl or aryl, which may be optionally substituted.

In one preferred embodiment, the amine (4) is (L17) a polymer obtainable by the process (L17P) comprising the two steps L17a) and L17b)

L17a) condensation of at least one compound selected from N-(hydroxyalkyl)amines of formulae (I.a) and/or (I.b), (I.a)

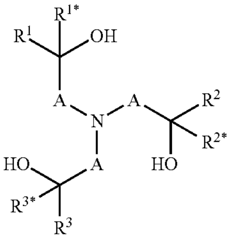

(I.b)

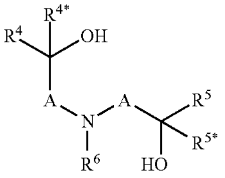

wherein

A are independently selected from $C_1$-$C_6$-alkylene;

$R^1$, $R^{1}$*, $R^2$, $R^{2}$*, $R^3$, $R^{3}$*, $R^4$, $R^{4}$*, $R^5$ and $R^{5}$* are independently of one another selected from hydrogen, alkyl, cycloalkyl or aryl, wherein the last three mentioned radicals may be optionally substituted; and $R^6$ is selected from hydrogen, alkyl, cycloalkyl or aryl, which may be optionally substituted; and L17b) reacting at least a part of the remaining hydroxy groups and/or, if present, at least a part of the secondary amino groups of the polyether provided in step L17a) with at least one alkylene oxide.

In one preferred embodiment, the amine (4) is (L18) a derivative obtainable by quaternization, protonation, sulphation and/or phosphation of the polymer (L16) or (L17).

In one preferred embodiment, the amine (4) is (L19) dendritic polyamines or their precursors selected from (L554) N,N,N',N'-tetraaminopropylalkylenediamine, (L555) dendritic amines obtainable from N,N,N',N'-tetraaminopropylalkylenediamine by amino-n-propylation (for example known as N14-, N30-, N62- and N128-amine according to the number of their nitrogen atoms), (L556) N,N,N',N'-tetraaminopropylethylenediamine, (L557) dendritic amines obtainable from N,N,N',N'-tetraaminopropylethylenediamine by amino-n-propylation (for example known as N14-, N30-, N62- and N128-amine according to the number of their nitrogen atoms), (L558) N,N,N',N'-tetraaminopropylpropylenediamine, (L559) dendritic amines obtainable from N,N,N',N'-tetraaminopropylpropylenediamine by amino-n-propylation (for example known as N14-, N30-, N62- and N128-amine according to the number of their nitrogen atoms), (L560) N,N,N',N'-tetraaminopropylbutylenediamine, (L561) dendritic amines obtainable from N,N,N',N'-tetraaminopropylbutylenediamine by amino-n-propylation (for example known as N14-, N30-, N62- and N128-amine according to the number of their nitrogen atoms).

In one preferred embodiment, the amine (4) is (L20) a bicyclic, tricyclic or higher polycyclic polyamine.

In one preferred embodiment, the amine (4) is (L21) an amine containing not more than one amino group and two alkoxy- or hydroxy-substituted C2 to C12 alkyl groups R21a and one C1 to C10 alkyl group R21b, wherein the R21a group bears the alkoxy or hydroxy substituent at a secondary or tertiary carbon atom and wherein the two groups R21a are identical.

In one preferred embodiment, the amine (4) is (L22) an amine containing not more than one amino group and one alkoxy- or hydroxy-substituted $C_2$ to $C_{12}$ alkyl group $R^{22a}$ and two $C_1$ to $C_{10}$ alkyl groups $R^{22b}$, wherein the two groups $R^{22b}$ are identical.

In one preferred embodiment, the amine (4) is (L23) an imidazolidinone N-substituted on one or two of its nitrogen atoms with alkyl groups $R^{23}$ wherein $R^{23}$ may optionally be substituted with OH groups.

In one preferred embodiment, the amine (4) is (L24) a morpholine N-substituted with alkyl groups $R^{24}$ wherein $R^{24}$ may optionally be substituted with OH groups.

In one preferred embodiment, the amine (4) is (L29) a homopolymer of amino acids.

In a preferred embodiment, the content of the TPT in the combination comprising the TPT and the amine (4) used in the premix (P) or used for obtaining the premix (P) is preferably in the range of 1 wt % to 99 wt %, more preferably in the range of 10 wt % to 87 wt %, most preferably in the range of 20 wt % to 75 wt %, particularly preferably in the range of 25 wt % to 65 wt %, particularly more preferably in the range of 30 wt % to 55 wt %, particularly in the range of 35 wt % to 45 wt %, based on the total weight of the combination comprising the TPT and the amine (4).

In another preferred embodiment, the content of the TPT in the combination comprising the TPT and the amine (4) used in the premix (P) or used for obtaining the premix (P) is preferably in the range of 30 wt % to 70 wt %, more preferably in the range of 40 wt % to 60 wt %, most preferably in the range of 45 wt % to 55 wt %, based on the total weight of the combination comprising the TPT and the amine (4).

In another preferred embodiment, the content of the TPT in the combination comprising the TPT and the amine (4) used in the premix (P) or used for obtaining the premix (P) is preferably in the range of 40 wt % to 80 wt %, more preferably in the range of 50 wt % to 70 wt %, most preferably in the range of 55 wt % to 65 wt %, based on the total weight of the combination comprising the TPT and the amine (4).

In another preferred embodiment, the content of the TPT in the combination comprising the TPT and the amine (4) used in the premix (P) or used for obtaining the premix (P) is preferably in the range of 10 wt % to 40 wt %, more preferably in the range of 15 wt % to 35 wt %, most preferably in the range of 20 wt % to 30 wt %, based on the total weight of the combination comprising the TPT and the amine (4).

In another preferred embodiment of the invention, the (thio)phosphoric acid triamide (2) is provided in combination with at least one organic solvent (5) having a boiling point of more than 100° C. In another preferred embodiment of the invention, the (thio)phosphoric acid triamide (2) is provided in combination with at least one amine (4) having a boiling point of more than 100° C. and at least one organic solvent (5) having a boiling point of more than 100° C. Preferably, the organic solvent (5) is an alcohol, more preferably a diol, triol, tetraol, pentaol, hexaol, heptaol, octaol, nonaol, decaol, or a polyol. Most preferably, the organic solvent (5) is a diol, triol, tetraol, pentaol, or hexaol. Particularly preferably, the organic solvent (5) is a diol. Particularly more preferably, the organic solvent (5) is ethanediol (ethylene glycol), propanediol (propylene glycol), or butanediol (butylene glycol). Particularly most preferably, the organic solvent (5) is propanediol (propylene glycol). For example, the organic solvent (5) is propane-1,2-diol (alpha-propylene glycol; CAS 57-55-6). According to another preferred embodiment, the organic solvent (5) is diethylene glycol. According to another preferred embodiment, the organic solvent (5) is DMSO. According to another preferred embodiment, the organic solvent (5) is a mixture comprising propane-1,2-diol and DMSO, preferably a mixture comprising 20 wt % to 80 wt % propane-1,2-diol and 20 wt % to 80 wt % DMSO, more preferably a mixture comprising 35 wt % to 65 wt % propane-1,2-diol and 35 wt % to 65 wt % DMSO based on the total weight of the organic solvent (5).

The organic solvent (5) is preferably an alcohol having 2 to 50 carbon atoms, more preferably an alcohol having 2 to 20 carbon atoms, most preferably an alcohol having 2 to 11 carbon atoms, particularly preferably an alcohol having 2 to 7 carbon atoms, in particular an alcohol having 2 to 4 carbon atoms, for example an alcohol having 3 carbon atoms.

In a preferred embodiment, the content of the TPT in the combination comprising the TPT and the organic solvent (5) used in the premix (P) or used for obtaining the premix (P) is preferably in the range of 1 wt % to 99 wt %, more preferably in the range of 10 wt % to 87 wt %, most preferably in the range of 20 wt % to 75 wt %, particularly preferably in the range of 25 wt % to 65 wt %, particularly more preferably in the range of 30 wt % to 55 wt %, particularly in the range of 35 wt % to 45 wt %, based on the total weight of the combination comprising the TPT and the organic solvent (5).

In another preferred embodiment, the content of the TPT in the combination comprising the TPT and the organic solvent (5) used in the premix (P) or used for obtaining the premix (P) is preferably in the range of 30 wt % to 70 wt %, more preferably in the range of 40 wt % to 60 wt %, most preferably in the range of 45 wt % to 55 wt %, based on the total weight of the combination comprising the TPT and the organic solvent (5).

In another preferred embodiment, the content of the TPT in the combination comprising the TPT and the organic solvent (5) used in the premix (P) or used for obtaining the premix (P) is preferably in the range of 40 wt % to 80 wt %, more preferably in the range of 50 wt % to 70 wt %, most preferably in the range of 55 wt % to 65 wt %, based on the total weight of the combination comprising the TPT and the organic solvent (5).

In another preferred embodiment, the content of the TPT in the combination comprising the TPT and the organic solvent (5) used in the premix (P) or used for obtaining the premix (P) is preferably in the range of 10 wt % to 40 wt %, more preferably in the range of 15 wt % to 35 wt %, most preferably in the range of 20 wt % to 30 wt %, based on the total weight of the combination comprising the TPT and the organic solvent (5).

In a preferred embodiment, the content of the TPT in the combination comprising the TPT and the amine (4) and the organic solvent (5) used in the premix (P) or used for obtaining the premix (P) is preferably in the range of 1 wt % to 99 wt %, more preferably in the range of 10 wt % to 87 wt %, most preferably in the range of 20 wt % to 75 wt %, particularly preferably in the range of 25 wt % to 65 wt %, particularly more preferably in the range of 30 wt % to 55 wt %, particularly in the range of 35 wt % to 45 wt %, based on the total weight of the combination comprising the TPT and the amine (4) and the organic solvent (5).

In another preferred embodiment, the content of the TPT in the combination comprising the TPT and the amine (4) and the organic solvent (5) used in the premix (P) or used for obtaining the premix (P) is preferably in the range of 30 wt % to 70 wt %, more preferably in the range of 40 wt % to 60 wt %, most preferably in the range of 45 wt % to 55 wt %, based on the total weight of the combination comprising the TPT and the amine (4) and the organic solvent (5).

In another preferred embodiment, the content of the TPT in the combination comprising the TPT and the amine (4) and the organic solvent (5) used in the premix (P) or used for obtaining the premix (P) is preferably in the range of 40 wt % to 80 wt %, more preferably in the range of 50 wt % to 70 wt %, most preferably in the range of 55 wt % to 65 wt %, based on the total weight of the combination comprising the TPT and the amine (4) and the organic solvent (5).

In another preferred embodiment, the content of the TPT in the combination comprising the TPT and the amine (4) and the organic solvent (5) used in the premix (P) or used for obtaining the premix (P) is preferably in the range of 10 wt % to 40 wt %, more preferably in the range of 15 wt % to 35 wt %, most preferably in the range of 20 wt % to 30 wt %, based on the total weight of the combination comprising the TPT and the amine (4) and the organic solvent (5).

The fertilizer composition as obtained by the method of the present invention also comprises a urea-containing fertilizer (1). This urea-containing fertilizer (1) may also further comprise other fertilizers such as N fertilizers, K fertilizers, or an additional P-containing fertilizer (3) which is preferably a NPK fertilizer, a NP fertilizer, a PK fertilizer, or a P fertilizer.

As used herein, the term "fertilizer" covers any chemical compound that improves the levels of available plant nutrients and/or the chemical and physical properties of soil, thereby directly or indirectly promoting plant growth, yield, and quality. Fertilizers are typically applied either through the soil (for uptake by plant roots) or by foliar feeding (for uptake through leaves). The term "fertilizer" can be subdivided into two major categories: a) organic fertilizers (composed of decayed plant/animal matter) and b) inorganic fertilizers (composed of chemicals and minerals). Organic fertilizers include manure, slurry, worm castings, peat, seaweed, sewage, and guano. Green manure crops are also regularly grown to add nutrients (especially nitrogen) to the soil. Manufactured organic fertilizers include compost, blood meal, bone meal and seaweed extracts. Further examples are enzymatically digested proteins, fish meal, and feather meal. The decomposing crop residue from prior years is another source of fertility. In addition, naturally occurring minerals such as mine rock phosphate, sulfate of potash and limestone are also considered inorganic fertilizers. Inorganic fertilizers are usually manufactured through chemical processes (such as the Haber-Bosch process), also using naturally occurring deposits, while chemically altering them (e.g. concentrated triple superphosphate). Naturally occurring inorganic fertilizers include Chilean sodium nitrate, mine rock phosphate, and limestone.

As used herein, a "urea-containing fertilizer (1)" is defined as a fertilizer comprising at least one component selected from the group consisting of urea, urea ammonium nitrate (UAN), isobutylidene diurea (IBDU), crotonylidene diurea (CDU) and urea formaldehyde (UF), urea-acetaldehyde, ureaglyoxal condensates.

In a preferred embodiment of the invention, the urea-containing fertilizer (1) is urea.

In a preferred embodiment of the invention, the weight percentage of the at least one component selected from the group consisting of urea, urea ammonium nitrate (UAN), isobutylidene diurea (IBDU), crotonylidene diurea (CDU) and urea formaldehyde (UF), urea-acetaldehyde, ureaglyoxal condensates in relation to the total weight of the urea-containing fertilizer (1) is at least 100 wt %, preferably at least 99.9 wt %, more preferably at least 99 wt %, most preferably at least 95 wt %, particularly preferably at least 90 wt %, particularly more preferably at least 80 wt %, particularly most preferably at least 70 wt %, particularly at least 60 wt %, for instance at least 50 wt %, for example at least 40 wt %.

In a preferred embodiment of the invention, the weight percentage of urea in relation to the total weight of the urea-containing fertilizer (1) is at least 100 wt %, preferably at least 99.9 wt %, more preferably at least 99 wt %, most preferably at least 95 wt %, particularly preferably at least 90 wt %, particularly more preferably at least 80 wt %, particularly most preferably at least 70 wt %, particularly at least 60 wt %, for instance at least 50 wt %, for example at least 40 wt %.

In a preferred embodiment of the invention, the weight percentage of the at least one component selected from the group consisting of urea, urea ammonium nitrate (UAN), isobutylidene diurea (IBDU), crotonylidene diurea (CDU) and urea formaldehyde (UF), urea-acetaldehyde, ureaglyoxal condensates in relation to the total weight of the urea-containing fertilizer (1) is more than 5 wt %, preferably more than 10 wt %, more preferably more than 20 wt %, most preferably more than 30 wt %, particularly preferably more than 40 wt %, particularly more preferably more than 50 wt %, particularly most preferably more than 60 wt %, particularly more than 70 wt %, for instance more than 80 wt %, for instance preferably more than 90 wt %, for example more than 94 wt %.

In a preferred embodiment of the invention, the weight percentage of urea in relation to the total weight of the urea-containing fertilizer (1) is more than 5 wt %, preferably more than 10 wt %, more preferably more than 20 wt %, most preferably more than 30 wt %, particularly preferably more than 40 wt %, particularly more preferably more than 50 wt %, particularly most preferably more than 60 wt %, particularly more than 70 wt %, for instance more than 80 wt %, for instance preferably more than 90 wt %, for example more than 94 wt %.

In customary commercial fertilizer quality, the urea has a purity of at least 90%, and may for example be in crystalline, granulated, compacted, prilled or ground form.

As used herein, the "P-containing fertilizer (3)" is any fertilizer providing any form of the chemical element phosphorus (P) or containing any chemical compounds incorporating the chemical element phosphorus (P), including but not limited to phosphate-containing fertilizers or fertilizers containing $P_2O_5$. Preferably, the P-containing fertilizer is selected from the group consisting of a NPK fertilizer, a NP fertilizer, a PK fertilizer, or a P fertilizer. Most preferably, the P-containing fertilizer is a NPK fertilizer. Of course, also combinations of these fertilizers may be used as additional P-containing fertilizer (3b).

P fertilizers, K fertilizers, and N fertilizers are straight fertilizers, i.e. fertilizers that contain only one of the nutritive elements P, K, and N. It is to be understood, however, that these fertilizers may additionally comprise at least one additional nutritive element selected from C, H, O, S, Ca, Mg, Fe, Mn, Cu, Zn, Mo, and B.

Preferred P fertilizers include basic slag (Thomas phosphate), superphosphate, triple superphosphate, partly digested phosphate rock, soft phosphate rock, dicalcium phosphate, thermal (fused) phosphate, aluminum phosphate, and combinations thereof.

NPK fertilizers, NP fertilizers, and PK fertilizers are multinutrient fertilizers, i.e. fertilizers that comprise combinations of the nutritive elements P, K, and N as indicated by the terms "NPK", "NP", and "PK". It is to be understood, however, that these fertilizers may additionally comprise at least one additional nutritive element selected from C, H, O, S, Ca, Mg, Fe, Mn, Cu, Zn, Mo, and B.

The NPK fertilizers, NP fertilizers, and PK fertilizers may be provided as complex fertilizers or bulk-blend or blended fertilizers. The term complex fertilizer refers to a compound fertilizer formed by mixing ingredients that react chemically. In bulk-blend or blended fertilizers, two or more granular fertilizers of similar size are mixed to form a compound fertilizer.

The premix (P) and urea melt (Q) are mixed in such a manner that the decomposition of the more heat sensitive urease inhibitor in the hotter melt of the urea or urea derivative containing compound before granulation is slowed down or even prevented. Since the urea melt (Q) has a higher temperature than the premix, it is advantageous to keep residence time of the mixture of the premix (P) and the urea melt (Q) before granulation as short as possible. This avoids important losses of TPT due to thermal decomposition in the hotter urea melt (Q) after being added to it. This can be achieved by providing the mixture as close as technically possible to the granulation unit, i.e. the premix (P) is injected into the pipeline carrying the urea melt (Q) within a short distance to the outlet of said pipeline into to granulation unit. The maximum residence time of the mixture (M) before granulation depends on the effective stability of the TPT under conditions and especially temperatures under which the urea melt (Q) is provided for granulation.

In an embodiment of the present method the residence time of the TPT in the urea melt (Q) is less than 60 minutes, preferably less than 45 minutes, more preferably less than 30 minutes, most preferably less than 15 minutes, particularly preferably less than 5 minutes, particularly more preferably less than 2.5 minutes and particularly most preferably less than 1 minute. When using NBPT and/or NPPT as TPT and urea melt (Q) comprised essentially by urea, maximum residence time may be less than 30 minutes, preferably less than 15 minutes, most preferably less than 5 minutes. In a most preferred embodiment, the residence time between injection (or mixing) and granulation is of approximately 0.2 to 1 minute. In one embodiment of the present method, the residence time of the at least one urease inhibitor in the urea melt (Q) is chosen such that any decomposition of the at least one urease inhibitor in the urea melt (Q) is lower than 15 percent, preferably lower than 12 percent, more preferably lower than 10 percent, most preferably lower than 8 percent, particularly preferably lower than 6 percent, particularly preferably lower than 5 percent, particularly more preferably lower than 4 percent, particularly more preferably lower than 3 percent, for instance lower than 2 percent, for example lower than 1 percent in respect to the initial TPT concentration.

To improve the mixing of the liquid or solid TPT-containing premix (P) with the urea melt (Q), a mixer can be used. For the above mentioned reasons, it is however advantageous to provide a static mixer with only a small residence time of the urea melt (Q) in the mixer. In another embodiment of the process, further additives, in particular a formaldehyde containing additive is added to the urea melt (Q). The additive is preferably added before the granulation process, e.g. in order to improve the physical properties of the granules, especially their caking behaviour. This can be realized just upfront of the granulation step, with a static mixer provided to assure a proper mixing of the additive and the urea melt (Q). In that case, it is advantageous to inject the TPT-containing premix (P) either together with these further additives, or to inject the TPT-containing premix (P) at a point close to the injection point of these further additives and upfront of the mixer. This is an economic solution since no additional mixer has to be provided.

In another embodiment, an external coating to prevent caking can be added after the granulation step.

The concentration of the TPT in the mixture (M) depends on many factors such as the efficiency of the inhibitor to block urease, and—as a consequence—the concentration necessary to achieve the desired agronomic effect. Therefore, the concentration depends on the nature of the TPT. Moreover, the concentration depends also on the stability of the TPT during the granulation process and during storage of the fertilizer, but also regulatory limits if ever they exist.

When using NBPT as urease inhibitor, the concentration is defined by regulatory limits (see European Fertilizer Regulation CE 2003/2003) and is optimized within these limits based on economic aspects as well as the expected lifetime of the fertilizer. Accordingly, the concentration of NBPT in urea is between 0.042 and 0.093 weight percent.

In general, the amount of TPT depends on the overall content of urea or urea derivative in the fertilizer.

No solvent with boiling point of less than 100° C. is used for or added to the TPT. Preferably, no solvent with boiling point of less than 120° C. is used for or added to the TPT. More preferably, no solvent with boiling point of less than 140° C. is used for or added to the TPT. Most preferably, no solvent with boiling point of less than 140° C. is used for or added to the TPT. Particularly, no solvent with boiling point of less than 160° C. is used for or added to the TPT. Particularly preferably, no solvent with boiling point of less than 180° C. is used for or added to the TPT. Particularly more preferably, no solvent with boiling point of less than 200° C. is used for or added to the TPT. Particularly most preferably, no solvent with boiling point of less than 220° C. is used for or added to the TPT. For example, no solvent with boiling point of less than 240° C. is used for or added to the TPT.

The premix (P) can be obtained via mixing the urea-containing fertilizer (1) with the TPT. The premix (P) can also be obtained via mixing the urea-containing fertilizer (1) with the TPT, wherein the TPT is combined with an amine (4) before mixing. The premix (P) can also be obtained via mixing the urea-containing fertilizer (1) with the TPT, wherein the TPT is dissolved in an amine (4) before mixing. For combining or dissolving TPT with/in an amine (4), heating may be required.

Temperature T1 is defined as the temperature (at normal pressure) of the TPT-containing premix (P) when this premix (P) is provided according to process step a) as described above.

It is furthermore preferred if the temperature T1 of the TPT-containing premix (P) is adjusted such that no or almost no release of $R_1R_2$—$NH_2$ as decomposition product of the TPT is detected. Thus, the temperature T1 of the TPT-containing premix (P) has to be adjusted to the chemical nature of the TPT. Also local overheating must be avoided for preventing any decomposition of the TPT.

In one embodiment, temperature T1 of the TPT-containing premix (P) is not more than the melting temperature of the TPT—and in case of more than one TPT used—is not more than the melting temperature of the highest-boiling TPT. In another embodiment, temperature T1 of the TPT-containing premix (P) is not more than the melting temperature of the TPT minus 3° C.—and in case of more than one TPT used—is not more than the melting temperature of the highest-boiling TPT minus 3° C. In yet another embodiment, temperature T1 of the TPT-containing premix (P) is not more than the melting temperature of the TPT minus 6° C.—and in case of more than one TPT used—is not more than the melting temperature of the highest-boiling TPT minus 6° C. In yet another embodiment, temperature T1 of the TPT-containing premix (P) is not more than the melting temperature of the TPT minus 10° C.—and in case of more than one TPT used—is not more than the melting temperature of the highest-boiling TPT minus 10° C. In yet another embodiment, temperature T1 of the TPT-containing premix (P) is not more than the melting temperature of the TPT minus 15° C.—and in case of more than one TPT used—is not more than the melting temperature of the highest-boiling TPT minus 15° C. In yet another embodiment, temperature T1 of the TPT-containing premix (P) is not more than the melting temperature of the TPT minus 20° C.—and in case of more than one TPT used—is not more than the melting temperature of the highest-boiling TPT minus 20° C. In yet another embodiment, temperature T1 of the TPT-containing premix (P) is not more than the melting temperature of the TPT minus 25° C.—and in case of more than one TPT used—is not more than the melting temperature of the highest-boiling TPT minus 25° C. In yet another embodiment, temperature T1 of the TPT-containing premix (P) is not more than the melting temperature of the TPT minus 30° C.—and in case of more than one TPT used—is not more than the melting temperature of the highest-boiling TPT minus 30° C. In yet another embodiment, temperature T1 of the TPT-containing premix (P) is not more than the melting temperature of the TPT minus 35° C.—and in case of more than one TPT used—is not more than the melting temperature of the highest-boiling TPT minus 35° C.

In another embodiment, temperature T1 of the TPT-containing premix (P) is preferably not more than 60° C., more preferably not more than 55° C., most preferably not more than 50° C., particularly preferably not more than 45° C., particularly more preferably not more than 40° C., particularly most preferably not more than 35° C., for instance not more than 30° C., for instance preferably not more than 25° C., for example not more than 20° C.

Temperature T2 is defined as the temperature (at normal pressure) of the urea melt (Q) at the moment when the TPT-containing premix (P) is added to this urea melt (U) according to process step b) as described above.

It is furthermore preferred if the temperature T2 of the urea melt (Q) is kept adjusted to a value just above the melting temperature of the mixture (M) in order to avoid further degradation of the TPT when added to this urea melt (Q). It is not excluded to introduce compounds in this mixture (M) in order to lower its melting temperature. In case this melt is essentially composed by urea, it is preferred if the temperature T2 of the melt (Q) is between 110° C. and 160° C., preferably between 120° C. and 140° C., most preferably between 130° C. and 135° C.

In a variant of the present method, the TPT-containing premix (P) and/or the urea melt (Q) comprises further additives, in particular a formaldehyde containing compound, in particular in form of urea-formaldehyde polymer or condensate.

The TPT-containing premix (P) may be added to the urea melt (Q) via a suitable pump and/or a flow meter or solid dosing apparatus. As mentioned previously, the mixture of the TPT-containing premix (P) and the urea melt (Q) may pass a static mixer located in the pipeline for mixing the premix (P) with the urea melt (Q) in order to achieve a homogenous distribution of all compounds within the combined melt. In a preferable embodiment, no further elements are located or disposed within the pipeline which would increase significantly the residence time of the melt mixture within the pipeline before granulation step.

In the further granulation step, the mixture of the TPT-containing premix (P) and the urea melt (Q) are transformed into solid fertilizer granules, whereas granulation should not be considered as a restrictive term in view of the applied method. The granulation step can be realized e.g. by one of the following processes:

Prilling process

Fluidized bed granulation

Drum granulation

Spherodizer process or any other process developed to form solid fertilizer granules.

The present method is carried out in a plant comprising:

at least one unit for supplying the TPT-containing premix (P);

at least one unit for supplying urea and/or the at least one urea derivative in molten form (such as a plant for production of urea or at least one melting unit for urea and/or at least one urea derivative);

at least one pipeline for transporting the urea melt (Q);

at least one inlet (for example injection nozzle) for feeding the TPT-containing premix (P) into the pipeline, optionally a mixer, preferably a static mixer, for mixing the TPT-containing premix (P) and the urea melt (Q), and at least one granulation unit, wherein the at least one inlet for the urease inhibitor melt and the preferably used static mixer are arranged upstream and close to the at least one granulation unit.

The term "unit" means particularly a separable and identifiable part of a plant and can be for example a machine, a tank system, or a pipeline system.

The term "close" in the context of the present invention means that the inlet for the TPT-containing premix (P) and the static mixer are near to the outlet of the pipeline transporting the urea melt (Q) into the granulation unit. This means that the distance between premix (P) inlet and granulation unit is chosen such that the residence time of the TPT in the urea melt (Q) is kept to a minimum, i.e. none or only a small percentage of the TPT is degraded in the urea melt (Q).

As mentioned above the object of the present invention is also solved by providing a fertilizer composition comprising the TPT and urea-containing fertilizer (1) that is obtainable by the described method.

The present composition is characterized by a homogenous distribution of the TPT within the urea-containing fertilizer (1).

The amount of TPT in the present composition may be preferably between 0.0001 and 5 wt %, more preferably between 0.001 and 3 wt %, most preferably between 0.005 and 1 wt %; the amount of urea-containing fertilizer (1) in the present composition may be between 5 and 99.95 wt percent, more preferably between 15 and 99 wt %, most preferably between 20 and 97 wt %, particularly between 25 and 95 wt %, for example between 30 and 90 wt %. Further additives, such as formaldehyde containing additives, or ammonium salts, may be added.

The present fertilizer composition is characterized by an increased storage stability. In particular the degradation of the TPT is slower in case of the present method compared for instance to a preparation wherein urea is coated with the urease inhibitor (e.g. NBPT), especially if no further additive for stabilizing the TPT is added.

The efficiency of the present urea fertilizer may also be described by means of ammonia volatilization (i.e. nitrogen loss by ammonia release to atmosphere) when applied to the soil surface. This ammonia release can be measured in lab tests or in field trials, and compared to the same fertilizer but not containing the urease inhibitor as reference under otherwise similar conditions.

The present method and fertilizer composition provide multiple advantages over the known processes:

Compared to the use of an TPT or NBPT solution, the technical advantage of the present method is that it does not require any solvent with boiling point of less than 100° C. in order to produce the combined fertilizer. No solvent means cost savings, less safety and health risks, no solvent residues in the final fertilizer or in the off-gases from the granulation process which would increase complexity in the off-gas purification device.

Compared to the addition of the TPT or NBPT in form of a melt as for example described in WO2017/125383, adding the TPT or NBPT in the form of a premix which is not a melt allows easier handling, because the premix can be produced on another site and then shipped to the plant as ready-to-use premix. Furthermore, an efficient NBPT Urea fertilizer can be obtained without employing Urea Formaldehyde Polymers as support for the NBPT. This means that the new process does not require a preceding production of such NBPT coated UFP but simply uses NBPT-containing premix to be added to the urea melt.

Storage of TPT treated urea has been examined at room temperature over several months in order to observe degradation of TPT during storage. Fertilizer samples have been stored in a climatic enclosure at 25° C. in closed bags. The content of the TPT can been analysed at different moments by HPLC using method DIN EN 16651. The ratio between the so analyzed content and the initial content of TPT is expressed as TPT recovery.

Ammonia volatilization of a fertilizer prepared according to the present method, compared to standard urea and urea surface coated with TPT or NBPT, has been analyzed by means of volatilization chambers. In these volatilization chambers, similar soil samples were placed in different cells under controlled conditions of humidity, each cell allowing the test of one fertilizer sample. The fertilizer samples are surface applied in the cells. The chambers are flushed by a constant flow of air, which passes after the chamber through a sulfuric acid trap. If volatilization takes place, ammonia is thus transferred into the trap and amount of volatilization is determined by analyzing the ammonia content in the trap. This volatilization is expressed as nitrogen loss in kg per ha, taking into account the soil surface of the cells and the quantity of fertilizer applied. Measures of the ammonia volatilization are continued over four weeks.

The present invention is further illustrated by the following examples.

EXAMPLES

Materials

Urease Inhibitors

Urease inhibitor "U1" was obtained from BASF SE. Composition:

18.75 wt.-% N-butylphosphorothioic triamide (NBPT, CAS-no.: 94317-64-3)

6.25 wt.-% N-propylphosphorothioic triamide (NPPT, CAS-no.: 916809-14-8)

LTM is the technical mixture (with a 100% concentration of NxPT) containing 25% NPPT and 75% NBPT.

LFG is polyethyleneimine with a weight average molecular weight of 800 g/mol as measured by GPC (dry substance, at pH 4.5)

Limus formulation is obtained by mixing the LTM (25% pure NxPT) was mixed with 15% DMSO, 5% LFG, and ad100% propylene glycol. The mixture was stirred until complete dissolution of the solid and analyzed for NxPT content (by HPLC), viscosity at 20° C. with a shear rate of 100 sec-1, dissolution (2%) in water and pH.

Fertilizers

Urea (Piagran 46) was obtained from SKW Piesteritz.

Urea granules were milled to <0.5 mm. Urea powder was mixed with NBPT and NPPT powder to form a premix.

Example 1 a) Premix 1: Urea granules were milled to <0.5 mm. Urea powder was mixed with Limus formulation in a ratio of 1:1 urea powder to solution, forming a suspension.

b) Premix 2: Urea granules were milled to <0.5 mm. Urea powder was mixed with Limus formulation in a ratio of 2:1 urea powder to solution, forming a paste.

c) Premix 3: Urea granules were milled to <0.5 mm. Urea powder was mixed with Limus formulation in a ratio of 10:1 urea powder to solution, forming a free flowing powder.

TABLE 1

Data of Example 1

| | Milled urea (g) | Limus formulation (g) | A.i. content measured (NBPT + NPPT) using HLPC (method DIN EN 16651) (wt %) |
|---|---|---|---|
| Premix 1 | 10.0 | 10.3 | 13.5 |
| Premix 2 | 10.0 | 5.0 | 8.5 |
| Premix 3 | 15.0 | 1.6 | 2.4 |

Example 2 d) Premix 4: Urea granules were milled to <0.5 mm. Urea powder was mixed with a solution of NBPT and NPPT in polyethyleneimine (40 wt %) in a ratio of 1:1 urea powder to solution. forming a viscous liquid.

e) Premix 5: Urea granules were milled to <0.5 mm. Urea powder was mixed with a solution of NBPT and NPPT in polyethyleneimine (40 wt %) in a ratio of 2:1 urea powder to solution. forming a paste.

f) Premix 6: Urea granules were milled to <0.5 mm. Urea powder was mixed with a solution of NBPT and NPPT in polyethyleneimine (40 wt %) in a ratio of 10:1 urea powder to solution. forming a free flowing powder.

TABLE 2

Data of Example 2

| | Milled urea (g) | NBPT/NPPT polyethyleneimine solution (g) | A.i. content measured (NBPT + NPPT) using HLPC (method DIN EN 16651) (wt %) |
|---|---|---|---|
| Premix 4 | 5.0 | 5.1 | 20.1 |
| Premix 5 | 5.0 | 2.7 | 13.3 |
| Premix 6 | 10.0 | 1.2 | 4.2 |

Example 3

Stainless steel pan was filled with 500 g urea and under continuous stirring heated to 135° C. After all urea was molten, the respective amount of premix was added and stirred in for 30 seconds. Afterwards, the molten urea was poured onto a stainless-steel tray and let cool down for 30 minutes at room temperature. Next, the solidified urea was broken up in pieces and 2×15 g sample, each dissolved in 100 mL water, were analyzed using HPLC method DIN EN 16651 and the measured a.i. concentrations were averaged and indicated in the right column (a.i. recovery).

| Exp. | Premix used | Premix amount (g) | Urea melt amount (g) | Target a.i. Concentration (wt %) | Measured a.i. Concentration (wt %) | A.i. Recovery (%) |
|---|---|---|---|---|---|---|
| S1 | Premix 1 | 2.13 | 500 | 0.057 | 0.055 | 95.6 |
| S2 | Premix 2 | 3.23 | 500 | 0.055 | 0.052 | 95.1 |
| S3 | Premix 3 | 11.53 | 500 | 0.054 | 0.052 | 96.3 |
| S4 | Premix 4 | 1.33 | 500 | 0.053 | 0.051 | 96.2 |
| S5 | Premix 5 | 1.94 | 500 | 0.052 | 0.051 | 98.7 |
| S6 | Premix 6 | 6.16 | 500 | 0.051 | 0.048 | 94.4 |

The results above show that the TPT contained in the premix does not decompose or degrade during the melting process, thus remains stable or stabilized during the melting process.

The invention claimed is:

1. A method for obtaining
a fertilizer composition comprising
(i) at least one urea-containing fertilizer (1); and
(ii) at least one (thio) phosphoric acid triamide (2) according to general formula (I)

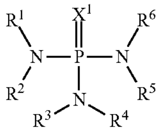

(I)

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di) alkylaminocarbonyl;
$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di) alkylaminocarbonyl; or
$R^1$ and $R^2$ together with the nitrogen atom linking them define a 5-or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl;
comprising the steps:
a) providing a solid and/or liquid premix (P)
wherein the premix (P) consists essentially of at least one urea-containing fertilizer (1) and at least one (thio) phosphoric acid triamide (2) in a weight ratio of 1:6 to 400:1 based on the total weight of all urea-containing fertilizers (1) and of all (thio) phosphoric acid triamides (2),
wherein at least 85 wt % of the premix (P)
(a1) is not a melt; and
(a2) is not obtained via melting of any of the at least one urea-containing fertilizer (1) or melting of any of the at least one (thio) phosphoric acid triamide (2); and
(a3) is not obtained via dissolving or mixing the at least one (thio) phosphoric acid triamide (2) in/with a solvent(S) having a boiling point of less than 100° C.; and
b) adding the premix (P) to a melt (Q) comprising urea-containing fertilizer (1) by forming a mixture (M) comprising the at least one urea-containing fertilizer (1) and the at least one (thio) phosphoric acid triamide (2), wherein the residence time of the thus formed mixture (M) before granulation is adjusted such that the at least one (thio) phosphoric acid triamide (2) is not or almost not decomposed in the mixture (M); and
c) forming solid fertilizer granules by use of the mixture (M) comprising the at least one urea-containing fertilizer (1) and the at least one (thio) phosphoric acid triamide (2).

2. The method according to claim 1, wherein the premix (P) as provided in process step a) consists essentially of at least one urea-containing fertilizer (1) and at least one (thio) phosphoric acid triamide (2) in a weight ratio of 4:1 to 50:1.

3. The method according to claim 1, wherein the urea-containing fertilizer (1) contained in the premix (P) has an average particle size in the range of 0.0001 to 60 mm.

4. The method according to claim 1, wherein the urea-containing fertilizer (1) contained in the premix (P) has an average particle size in the range of 0.005 to 4 mm.

5. The method according to claim 1, wherein the premix (P) as provided in process step a) consists essentially of
at least one urea-containing fertilizer (1) and
at least one (thio) phosphoric acid triamide (2) combined with an amine having a boiling point of more than 100° C.

6. The method according to claim 1, wherein the premix (P) as provided in process step a) consists essentially of
at least one urea-containing fertilizer (1) and
at least one (thio) phosphoric acid triamide (2) combined with a polymeric polyamine.

7. The method according to claim 1, wherein the premix (P) is liquid.

8. The method according to claim 1, wherein the premix (P) is solid.

9. The method according to claim 1, wherein the premix (P) is provided at a temperature T1 which is not more than the melting point of the highest-boiling (thio) phosphoric acid triamide (2) among the at least one (thio) phosphoric acid triamide (2).

10. The method according to claim 1, wherein the premix (P) is provided at a temperature T1 which is not more than 50° C.

11. The method according to claim 1, wherein the premix (P) is provided at a temperature T1 which is not more than 50° C.

12. The method according to claim 1, wherein the at least one (thio) phosphoric acid triamide (2) is N-n-butylthiophosphoric acid triamide (NBPT).

13. The method according to claim 1, wherein the at least one (thio) phosphoric acid triamide (2) is N-n-propylthiophosphoric acid triamide (NPPT).

14. The method according to claim 1, wherein the at least one (thio) phosphoric acid triamide (2) is a combination of N-n-butylthiophosphoric acid triamide (NBPT) and N-n-propylthiophosphoric acid triamide (NPPT).

15. The method according to claim 1, wherein the urea-containing fertilizer (1) is urea.

16. The method according to claim 1, wherein at least 98 wt % of the premix (P)
(a1) is not a melt; and
(a2) is not obtained via melting of any of the at least one urea-containing fertilizer (1) or melting of any of the at least one (thio) phosphoric acid triamide (2); and
(a3) is not obtained via dissolving or mixing the at least one (thio) phosphoric acid triamide (2) in/with a solvent(S) having a boiling point of less than 100° C.

* * * * *